US008677345B2

(12) United States Patent
Choi et al.

(10) Patent No.: US 8,677,345 B2
(45) Date of Patent: Mar. 18, 2014

(54) SYSTEM FOR CREATING VIRTUAL APPLICATION, METHOD FOR INSTALLING VIRTUAL APPLICATION, METHOD FOR CALLING NATIVE API AND METHOD FOR EXECUTING VIRTUAL APPLICATION

(75) Inventors: Jong Uk Choi, Seoul (KR); Dongha Shin, Gyeonggi-do (KR); Sung Wook Jung, Gyeonggi-do (KR); Jiyeon Kim, Seoul (KR); Muhammad Ali Malik, Seoul (KR)

(73) Assignee: Markany Inc., Seoul (KP)

( * ) Notice: Subject to any disclaimer, the term of this patent is extended or adjusted under 35 U.S.C. 154(b) by 1039 days.

(21) Appl. No.: 12/673,684

(22) PCT Filed: Aug. 13, 2008

(86) PCT No.: PCT/KR2008/004713
§ 371 (c)(1),
(2), (4) Date: Feb. 16, 2010

(87) PCT Pub. No.: WO2009/022861
PCT Pub. Date: Feb. 19, 2009

(65) Prior Publication Data
US 2011/0072424 A1    Mar. 24, 2011

(30) Foreign Application Priority Data

Aug. 16, 2007  (KR) ........................ 10-2007-0082485

(51) Int. Cl.
*G06F 9/44*    (2006.01)
*G06F 9/445*   (2006.01)

(52) U.S. Cl.
USPC ........... 717/174; 717/172; 717/173; 717/175; 717/176; 717/177; 717/178

(58) Field of Classification Search
None
See application file for complete search history.

(56) References Cited

U.S. PATENT DOCUMENTS

| | | | | |
|---|---|---|---|---|
| 5,361,349 A * | 11/1994 | Sugita et al. | ........................ | 1/1 |
| 6,763,518 B2 * | 7/2004 | Hart et al. | ........................ | 718/1 |
| 6,964,039 B2 * | 11/2005 | Heeb | ........................ | 717/148 |
| 7,155,381 B2 * | 12/2006 | Ryzl | ........................ | 703/24 |
| 7,305,671 B2 * | 12/2007 | Davidov et al. | ............... | 717/172 |
| 7,356,679 B1 * | 4/2008 | Le et al. | ........................ | 713/1 |
| 7,512,932 B2 * | 3/2009 | Davidov et al. | ............... | 717/106 |
| 7,565,647 B2 * | 7/2009 | Davidov et al. | ............... | 717/140 |
| 7,627,860 B2 * | 12/2009 | Kodosky et al. | ............... | 717/141 |

(Continued)

OTHER PUBLICATIONS

"Windows NT/2000 Native API Reference" by Gary Nebbett.*

(Continued)

*Primary Examiner* — Henry Tsai
*Assistant Examiner* — Jing-Yih Shyu
(74) *Attorney, Agent, or Firm* — Occhiuti & Rohlicek LLP

(57) ABSTRACT

A virtual application creating system comprises: a virtual environment library block including a plurality of modules that process native application program interfaces (APIs) of an operating system such that the native application APIs are suited to a virtual environment, finding a module capable of processing a specific native API from the plurality of modules when the specific native API is called and operating the found module; a virtual application installation block receiving position information of an application to be virtualized and information on an installation place where the application will be virtualized and installed from a user and inserting the virtual environment library block into a memory to install a virtual application in the installation place; and a virtual application execution block executing the virtual application installed in the installation place.

15 Claims, 28 Drawing Sheets

(56) References Cited

U.S. PATENT DOCUMENTS

| | | | |
|---|---|---|---|
| 7,890,951 | B2* | 2/2011 | Vinberg et al. ............. 717/174 |
| 8,136,100 | B1* | 3/2012 | Goldman ..................... 717/136 |
| 8,296,742 | B2* | 10/2012 | Biswas et al. ............... 717/136 |
| 2004/0015913 | A1* | 1/2004 | Heeb .......................... 717/148 |
| 2004/0240408 | A1* | 12/2004 | Gur .............................. 370/328 |
| 2005/0108692 | A1* | 5/2005 | Lau et al. .................... 717/136 |
| 2005/0188374 | A1 | 8/2005 | Magenheimer |
| 2006/0101438 | A1* | 5/2006 | Mariani ...................... 717/148 |
| 2006/0143359 | A1 | 6/2006 | Dostert |
| 2006/0218536 | A1* | 9/2006 | Kirilline et al. ............. 717/127 |
| 2007/0006218 | A1* | 1/2007 | Vinberg et al. ............. 717/174 |
| 2007/0074170 | A1* | 3/2007 | Rossmann ................... 717/127 |
| 2007/0168953 | A1* | 7/2007 | Diez et al. ................... 717/118 |
| 2007/0240171 | A1* | 10/2007 | Biro et al. ................... 719/328 |
| 2008/0098368 | A1* | 4/2008 | Biswas et al. ............... 717/136 |
| 2008/0104572 | A1 | 5/2008 | Hernandez |
| 2008/0222631 | A1* | 9/2008 | Bhatia et al. ................ 717/178 |
| 2009/0063614 | A1* | 3/2009 | Donawa et al. ............. 709/202 |
| 2011/0016466 | A1* | 1/2011 | Liu et al. ......................... 718/1 |
| 2011/0061048 | A1* | 3/2011 | Katoh ......................... 717/177 |

OTHER PUBLICATIONS

"The CDC Application Management System" Java—Platform, Micro Edition White Paper, Jun. 2005.*

"J2ME Building Blocks for Mobile Devices" White Paper on KVM and the Connected, Limited Device Configuration (CLDC), May 19, 2000.*

"Dynamic recompilation and profile-guided optimisations for a .NET JIT compiler", K. Vaswani and Y.N. Srikant, IEE Proc.-Softw., vol. 150, No. 5, Oct. 2003.*

"Compact Java Binaries for Embedded Systems", Derek Rayside, Evan Mamas, Erik Hons, University of Waterloo Waterloo, Ontario, Canada.*

"wrapperWeir.cpp on VmApps—Attachment—BOINC" 2008 University of California.*

"Architecture and Policy for Adaptive Optimization in Virtual Machines" by Matthew Arnold, Stephen Fink, David Grove, Michael Hind, Peter F. Sweeney, IBM Research Report, RC23429 (W0411-12S) Nov. 12, 2004.*

"A Survey of Adaptive Optimization in Virtual Machines" by Matthew Arnold, Stephen Fink, David Grove, Michael Hind, Peter F. Sweeney, Proceedings of the IEEE, vol. 93, No. 2, Feb. 2005.*

* cited by examiner

SYSTEM FOR CREATING VIRTUAL APPLICATION, METHOD FOR INSTALLING VIRTUAL APPLICATION, METHOD FOR CALLING NATIVE API AND METHOD FOR EXECUTING VIRTUAL APPLICATION

CROSS-REFERENCE TO RELATED APPLICATIONS

This application is the National Stage of International Application No. PCT/KR2008/004713, filed on Aug. 13, 2008, which claims the benefit of Korean Application Serial No. 10-2007-0082485, filed on Aug. 16, 2007. The contents of both of the foregoing applications are hereby incorporated by reference in their entirety.

TECHNICAL FIELD

The present invention relates to a virtual application creating system, a virtual application installing method, a native application program interface (API) calling method and a virtual application executing method, and more particularly, to a virtual application program creating technique capable of virtualizing selected software, installing the virtual software in a designated position and efficiently executing the virtual software.

BACKGROUND ART

With the development of digital technology and popularization of high-speed Internet service in recent years, a variety of works which were manually performed have been replaced with computing works. For example, a user can edit desired documents in various forms using a tool such as a word-processor or a work sheet to improve time and working efficiency.

A conventional host computer includes hardware having a control processor, a memory, an input/output interface and a communication interface, an operating system for managing and controlling a system based on the hardware, and an application program for executing designated specific functions under the operating system. A user initializes the hardware and the operating system of the host computer, executes the specific application program and carries out a desired work using various functions provided by the executed application program.

When the user wants to suspend a predetermined work performed in the host computer using a specific application and then continue the work with data of the work using another host computer, an application program capable of supporting the work, for example, an application program identical to the specific application program or an application program providing the same function as the specific application program, must be installed in the other host computer.

If the application program capable of supporting the work does not exist in the other host computer, the user should obtain an installation CD or file and install files required to support the work in the host computer through an application installation process. Furthermore, it may be required to delete the installed files for security maintenance after the work is finished.

In this case, however, a time is required for the user to newly install the application program in the host computer and then delete the application program, which is inconvenient for the user. This problem becomes serious as the number of host computers used by the user increases. Furthermore, when the host computer by which the user newly performs a work is a commonly used computer or a computer owned by another person, a disk storage space may be unnecessarily consumed and, even though the user executes an application program and then deletes the application program, remnants of the application program may be left or spyware may remain in the host computer.

Accordingly, various techniques have been developed in order to solve the aforementioned problems. One of the techniques is a virtual application creating tool. The virtual application creating tool is a software tool that virtualizes applications and packages the virtualized applications to create a single portable program. That is, the virtual application creating tool creates a portable program from applications. Virtual application creating tools currently being on the market include Thinstall, AutoIt Macro Script, Auto Batch File and so on.

To package a specific application, the virtual application creating tool performs pre-scan for scanning the image of the window of a host computer, installs the application in the host computer through install software, and then carries out post-scan for scanning the image of the window of the host computer after installation. Subsequently, the virtual application creating tool compares the window image obtained by the pre-scan with the window image obtained by the post-scan to detect variations in the system, which are caused by the installation of the application, and creates an execution file that can be independently executed, that is, a virtual application program.

Accordingly, the user can copy the created execution file to a portable external storage unit, for example, a USB (Universal Serial Bus) storage device, connect the external storage unit to another host computer and execute the execution file to perform a desired work. As described above, the virtual application creating tool can make application programs portable.

However, conventional virtual application creating techniques have serious problems in spite of the aforementioned advantages.

Firstly, the conventional virtual application creating tools have an image comparison algorithm according to pre-scan and post-scan, and thus packaging accuracy is deteriorated and an error generation rate is high. Furthermore, due to this problem, perfect software having an application desired by a user and only objects related to the application cannot be created.

An operating system such as Windows simultaneously executes many processes, for example, daemon processes, with application programs. In this case, files may be frequently created and modified in a specific daemon process while an application that a user wants to virtualize is installed using an application installation program in the Windows. The creation and modification of files affect image comparison because unnecessary files can be stored in an image file. In practical, the conventional virtual application creating tools have a considerably high error generation rate when creating virtual applications.

Secondly, the conventional virtual application creating tools require excessively large number of complicated processes to create a virtual application. For example, the conventional virtual application creating tools must perform pre-scan and post-scan in order to create a virtual application and a user should delete unnecessary files one by one in order to reduce errors in image comparison. Accordingly, a long time is needed and it is difficult for a novice to create a virtual application.

Thirdly, when the same application as the application to be virtualized is previously installed in a host computer, the application previously installed in the host computer may be deleted while the virtual application is installed through a virtual application creating tool.

DISCLOSURE OF INVENTION

Technical Problem

A first object of the present invention is to provide a virtual application creating system capable of virtualizing a desired application, installing the virtual application in a position designated by a user and effectively executing the virtual application.

A second object of the present invention is to provide a virtual application installing method capable of installing a desired application in a position selected by a user.

A third object of the present invention is to provide a native API calling method capable of processing an operating system called when a virtual application is installed or executed, for example, windows native API.

A fourth object of the present invention is to provide a virtual application executing method capable of executing a virtual application installed in a designated position according to a virtual application installation process.

Technical Solution

To accomplish the first object of the present invention, an aspect of the present invention provides a virtual application creating system. The virtual application creating system comprises a virtual environment library block including a plurality of modules that process native application program interfaces (APIs) of an operating system such that the native application APIs are suited to a virtual environment, finding a module capable of processing a specific native API from the plurality of modules when the specific native API is called and operating the found module; a virtual application installation block receiving position information of an application to be virtualized and information on an installation place where the application will be virtualized and installed from a user and inserting the virtual environment library block into a memory to install a virtual application in the installation place; and a virtual application execution block executing the virtual application installed in the installation place.

To accomplish the second object of the present invention, another aspect of the present invention provides a method for installing a virtual application. The method for installing a virtual application comprises the steps of receiving position information of an application to be virtualized and information on an installation place where the application will be virtualized and installed; creating a process of installing the application using the received information and inserting a virtual environment library including a plurality of modules capable of constructing a virtual environment into the created application installation process to convert the application installation process to a virtual application installation process; and performing the virtual application installation process to install a virtual application in the installation place.

To accomplish the third object of the present invention, another aspect of the present invention provides a method for calling native APIs. The method for calling native APIs of an operating system using a virtual environment library including a plurality of modules capable of processing the native APIs such that the native APIs are suited to a virtual environment comprises the steps of confirming a module capable of processing a specific native API among the plurality of modules when the specific native API is called while a virtual application is installed and executed; and operating the confirmed module to process the function of the called native API such that the native API is suited to the virtual environment.

To accomplish the fourth object of the present invention, another aspect of the present invention provides a method for executing a virtual application. The method for executing a virtual application comprises the steps of storing information of the root directory of a virtual application and position information of the virtual application as variables; creating a virtual application execution process for executing the virtual application using the information included in the variables; and inserting a virtual environment library including a plurality of modules capable of constructing a virtual environment into the created virtual application execution process and performing the virtual application execution process.

Advantageous Effects

As described above, according to the present invention, only related modules capable of processing a virtual environment to install a virtual application are copied to a virtual execution environment, and thus a complicated installation procedure such as pre-scan or post-scan is not required to install the virtual application and the virtual application can be installed through a single application installation process. Furthermore, even though an application identical to an application previously installed in a host executed environment is installed in the virtual environment through a virtual and host process provided by modules of a virtual environment library block, the application previously installed in the host executed environment is not affected. This can secure program execution stability.

MODE FOR THE INVENTION

The present invention will be described more fully hereinafter with reference to the accompanying drawings, in which exemplary embodiments of invention are shown. The described embodiments may be modified in various different ways, all without departing from the spirit or scope of the present invention.

Figure 1:
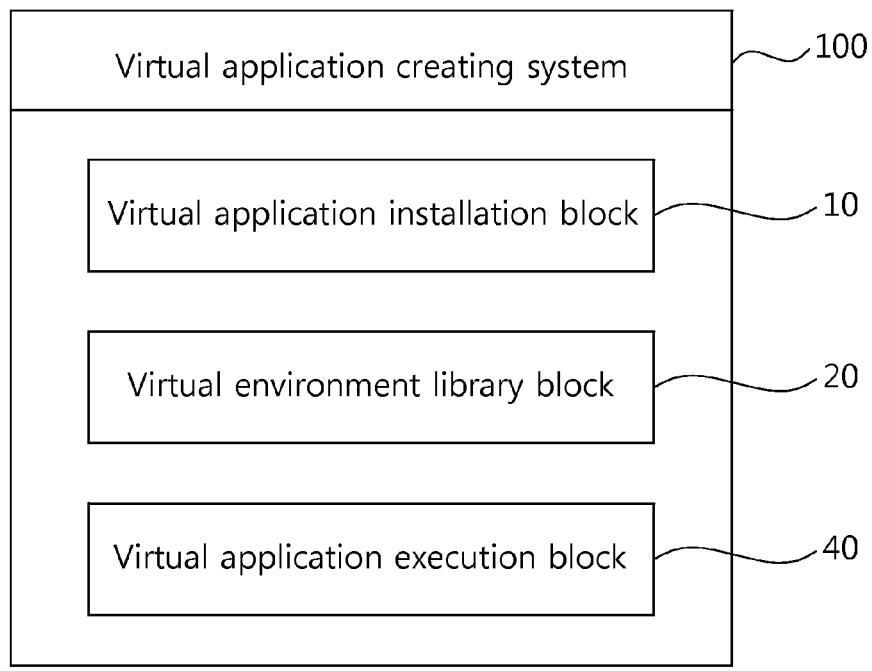
FIG. 1 is a block diagram of a virtual application creating system according to a preferred embodiment of the present invention.

FIG. 1 is a block diagram of a virtual application program creating system according to a preferred embodiment of the present invention.

Referring to FIG. 1, the virtual application creating system 100 according to a preferred embodiment of the present invention includes a virtual application installation block 10, a virtual environment library block 20 and a virtual application execution block 40.

The virtual application installation block 10 receives information on an installation place where a virtual application will be installed and position information of the virtual application, virtualizes a selected application and installs the virtual application in the installation place. Here, the installed virtual application can be executed by the virtual application execution block. That is, the virtual application execution block 40 executes the installed virtual application. The virtual environment library block 20 includes a plurality of modules capable of installing and executing a virtual application and provides the modules when the virtual application is installed and executed.

Each of the aforementioned blocks can include a plurality of modules. Here, a module is a unit capable of performing a predetermined unit function and it can mean a specific function or a set of functions. The configurations and operations of the modules of each block will now be explained.

Figure 2:
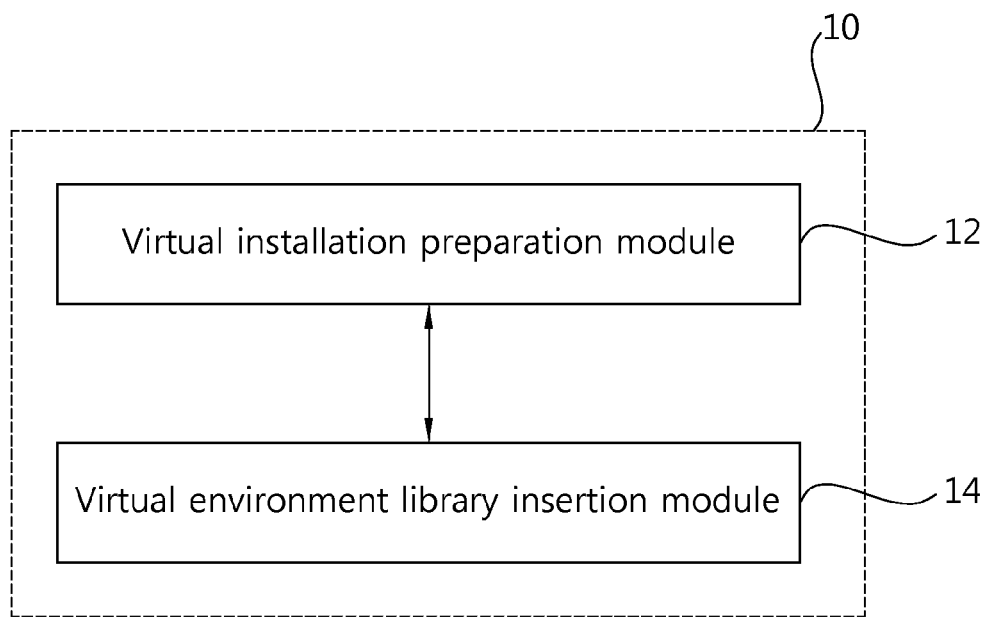
FIG. 2 is a block diagram showing a module configuration of a virtual application installation block illustrated in FIG. 1.

FIG. 2 is a block diagram of a module configuration of the virtual application installation block 10 illustrated in FIG. 1.

Referring to FIG. 2, the virtual application installation block 10 includes a virtual installation preparation module 12 and a virtual environment library insertion module 14.

The virtual installation preparation module 12 receives information on an installation place where a virtual application will be installed and position information of an application to be virtualized from a user and provides the received information to the virtual environment library insertion module 14. In addition, the virtual installation preparation module 12 can search for information on a virtual application previously installed in the installation place.

Figure 3:
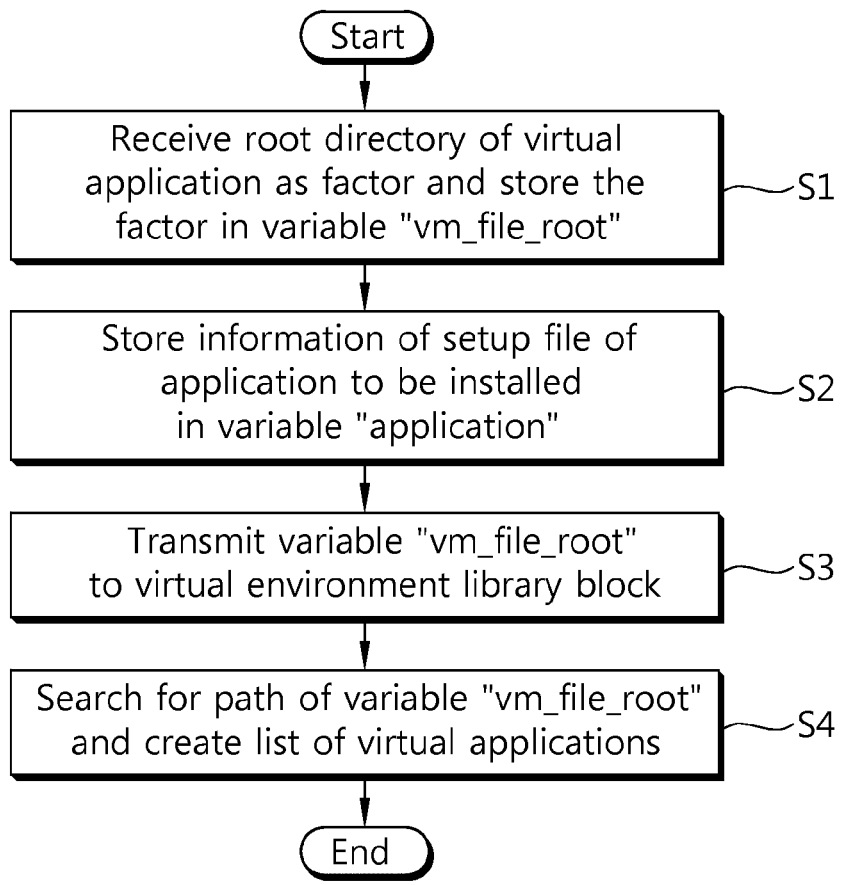
FIG. 3 is a flow chart showing the operation of a virtual installation preparation module illustrated in FIG. 2

FIG. 3 is a flow chart showing the operation of the virtual installation preparation module 12 illustrated in FIG. 2.

Referring to FIG. 3, the virtual installation preparation module 12 receives information on an installation place where a virtual application will be installed from a user and stores the received information. Here, the installation place can be a place where a virtual environment will be constructed. For example, the virtual installation preparation module 12 provides a directory selection window to the user, receives information on a directory (that is, the root directory of a virtual application), which selected by the user as an installation place through the directory selection window, as a factor and stores the received information in a variable "vm_file_root" in step S1.

The installation place can exist in an external storage unit connectable to a host computer through an interface such as USB. That is, the virtual application can be installed in the external storage unit and the external storage unit can be connected to another host computer to execute the application, which will be explained in more detail later.

The virtual installation preparation module 12 receives position information of an application to be virtualized from the user and stores the received position information. The position information can be position information of the setup file of the application stored in the host computer, that is, path information accessible by the setup file. For example, the virtual installation preparation module 12 provides a file selection window to the user and, when the user selects the setup file of a desired application through the file selection window, stores position information of the setup file in a variation "application" in step S2.

Then, the virtual installation preparation module 12 transmits the stored information on the installation place to the virtual environment library block 20. For example, the virtual installation preparation module 12 can transmit the stored variable "vm_file_root" to the virtual environment library block 20 in step S3.

Furthermore, the virtual installation preparation module 12 can search for the installation place corresponding to the stored information on the installation place to create a list of virtual applications in step S4. That is, the virtual installation preparation module 12 creates a list of virtual applications previously stored in the installation place in order to check whether a virtual application identical to the virtual application to be installed in the installation place has been previously installed therein. For example, the virtual installation preparation module 12 can search for the path of the stored variable "vm_file_root" to create a list of virtual applications installed in the corresponding directory.

The virtual environment library insertion module 14 illustrated in FIG. 2 fetches a corresponding application installation process using the position information of the application, input by the user, and inserts the virtual environment library block 20 into the application program installation process and executes a virtual application installation process.

Figure 4:
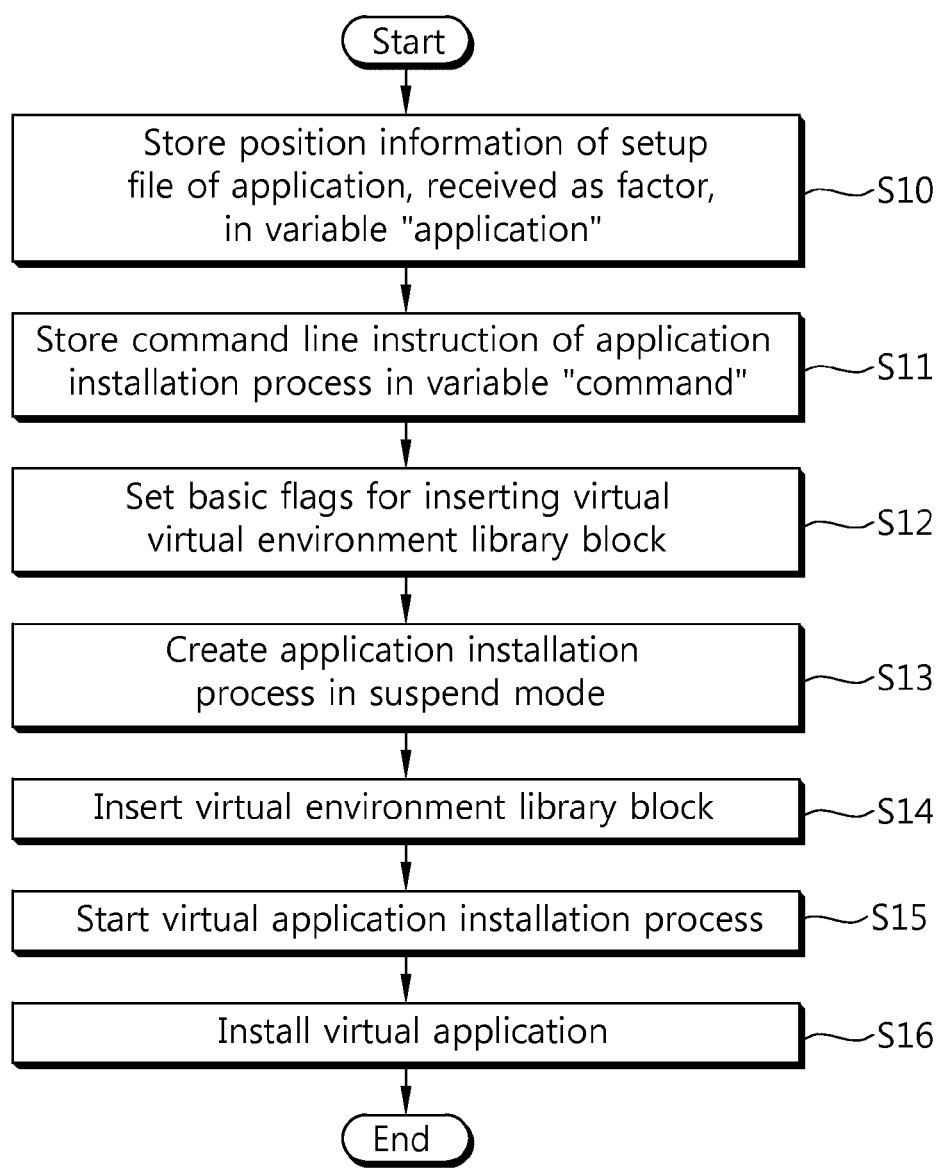
FIG. 4 is a flow chart showing the operation of a virtual environment library insertion module illustrated in FIG. 2.

FIG. 4 is a flow chart showing the operation of the virtual environment library insertion module 14 illustrated in FIG. 2.

Referring to FIG. 4, the virtual environment library insertion module 14 receives the position information of the application to be virtualized from the virtual installation preparation module 12 and stores the received position information. For example, the virtual environment library insertion module 14 receives the position information of the application, transmitted from the virtual installation preparation module 12, as a factor and stores the factor in the variable "application" in step S10. As described above, the position information of the application to be virtualized can be position information of the setup file of the application.

The virtual environment library insertion module 14 acquires the application installation process using the stored position information of the application and performs a preparatory work for carrying out the virtual application installation process. For example, the virtual environment library insertion module 14 fetches the setup file of the application to be virtualized using the stored position information, stores a command line instruction of the application installation process existing in the setup file in a variable "command" in step S11, sets basic flags for inserting the virtual environment library block 20 in step S12 and creates the application installation process in a suspend mode in step S13.

When the preparatory work is completed, the virtual environment library insertion module 14 inserts the virtual environment library block 20 into the created application installation process in step S14. For example, the virtual environment library insertion module 14 can modify a memory region of the application installation process loaded in a memory and insert the virtual environment library block 20 into the application installation process. Through this procedure, the application installation process is converted to the virtual application installation process.

Here, the virtual environment library block 20 can mean a dynamic linking library (DLL) including modules each of which is composed of a function or a set of functions, which will be explained later. For example, the virtual environment library block 20 can be represented as a DLL file such as "vm.dll". The file "vm.dll" can be inserted into the process according to the virtual environment library insertion module 14 to execute functions provided by the operating system of the host computer, that is, the library file "ntdll.dll" of Windows, in a virtual environment. Accordingly, when the operating process of the application is performed while the virtual environment library block 20 is inserted into the operating process, the operating process of the virtual application is executed.

Upon the completion of insertion of the virtual environment library block 20, the virtual environment library insertion module 14 starts the converted virtual application installation process (in the suspend mode) in step S15. Then, the application selected by the user is installed in the installation place (for example, an external storage unit) selected by the user as a virtual application in a virtual environment according to the virtual application installation process in step S16.

Figure 5:
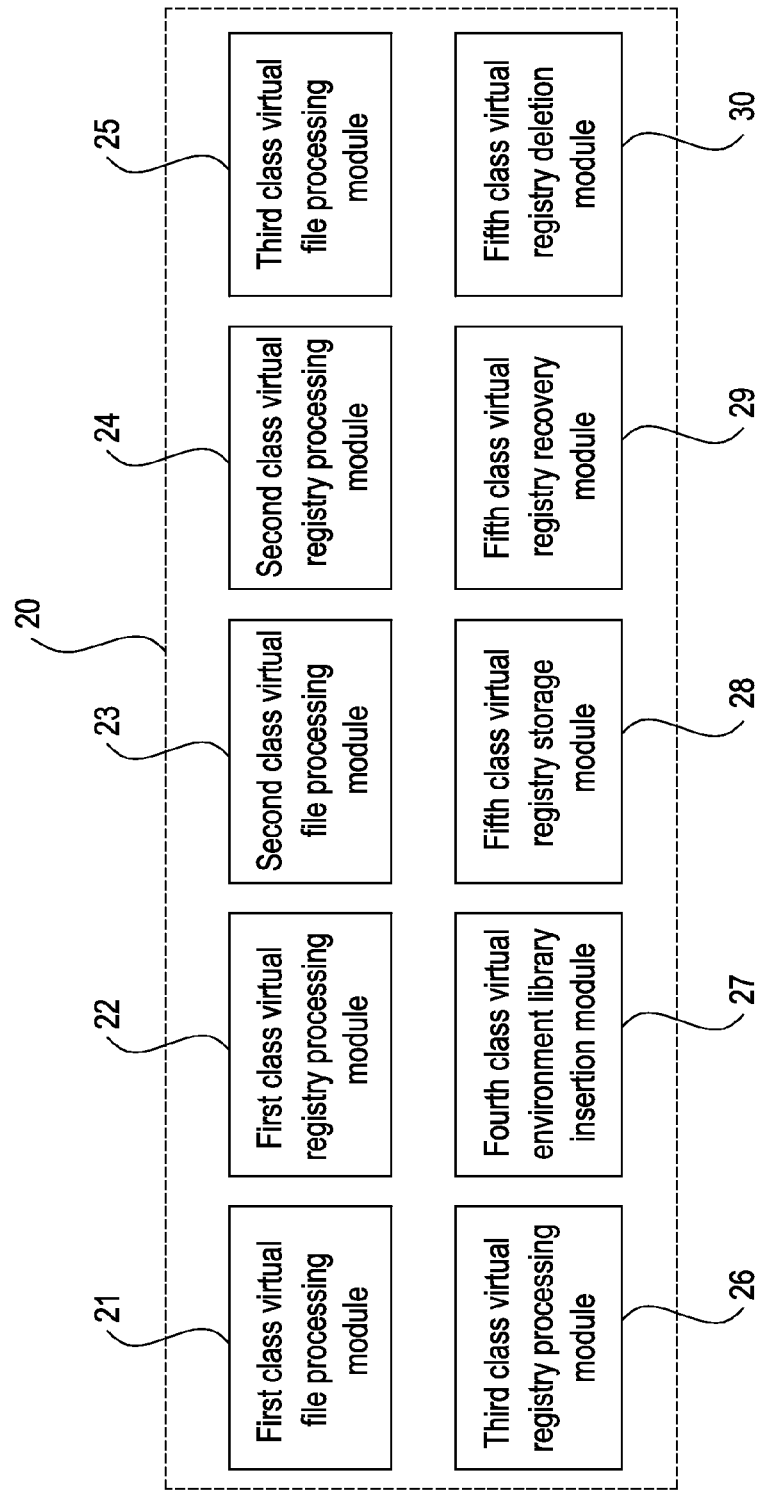
FIG. 5 is a block diagram showing a module configuration of a virtual environment library block illustrated in FIG. 1.

FIG. 5 is a block diagram showing a module configuration of the virtual environment library block 20 illustrated in FIG. 1.

Referring to FIG. 5, the virtual environment library block 20 includes a dynamic linking library composed of modules capable of constructing a virtual environment. Accordingly, the virtual environment library block 20 can be represented as a dynamic linking library file "vm.dll".

When a specific NTDLL function of the window native library "ntdll.dll", that is, window native API, is called while the virtual application is installed or executed, the virtual environment library block 20 (that is, "vm.dll") provides a virtualization function such that the called window native API can be executed in a virtual environment.

The virtual environment library block 20 includes a plurality of modules. For example, the virtual environment library block 20 includes a first class virtual file processing module 21, a first class virtual registry processing module 22, a second class virtual file processing module 23, a second class virtual registry processing module 24, a third class virtual file processing module 25, a third class virtual registry processing module 26, a fourth class virtual environment library insertion module 27, a fifth class virtual registry storage module 28, a fifth class virtual registry recovery module 29, and a fifth class registry deletion module 30.

These modules have functions of processing specific native window APIs such that the functions of the native window APIs can be executed in a virtual environment when the native window APIs are called. The native window APIs can include file related APIs, registry related APIs and process related APIs.

These native window APIs can be classified into five classes, that is, a first class, a second class, a third class, a fourth class and a fifth class, according to a predetermined standard. The definition of the classes and functions included in the classes are explained.

The first class receives a variable "POBJECT_ATTRIBUTES ObjectAttributes" among the window native APIs as a factor and includes APIs that return data with respect to PHANDLE type file or key, for example, "PHANDLE FileHandle" or "PHANDLE KeyHandle". Window native APIs belonging to the first class include "ZwCreateFile", "ZwOpenFile", "ZwDeleteFile", "ZwQueryAttributesFile", "ZwQueryFullAttributesFile", "ZwCreateKey", "ZwOpenKey", "ZwDeleteKey", etc.

The native window APIs belonging to the first class are processed by the first class virtual file processing module 21 or the first class virtual registry processing module 22. For example, a file related API among the native window APIs belonging to the first class can be processed by the first class virtual file processing module 21 and a registry related API can be processed by the first class virtual registry processing module 22.

The second class receives data with respect to HANDLE type file or key among the window native APIs, for example, "HANDLE FileHandle" or "HANDLE KeyHandle", as a factor and includes functions that return character strings related to object names. The window native APIs of the second class include "ZwQueryInformationFile", "ZwSetInformationFile", "ZwQueryKey", etc.

The native window APIs belonging to the second class are processed by the second class virtual file processing module 23 or the second class virtual registry processing module 24. For example, a file related API among the native window APIs belonging to the second class can be processed by the second class virtual file processing module 23 and a registry related API can be processed by the second class virtual registry processing module 24.

The third class includes functions that require child objects of objects among the window native APIs. The functions of the third class receive data with respect to HANDLE type file or key, for example, "HANDLE FileHandle", as a function factor and return "PVOIDFileInformation". The window native APIs of the third class include "ZwQueryDirectoryFile", "ZwClose", "ZwEnumerateKey", etc.

The native window APIs belonging to the third class are processed by the third class virtual file processing module 25 or the third class virtual registry processing module 26. For example, a file related API among the native window APIs belonging to the third class can be processed by the third class virtual file processing module 25 and a registry related API can be processed by the third class virtual registry processing module 26.

The fourth class includes window native APIs used for an application installation process. The window native APIs of the fourth class include ZwCreateProcess as a process related API, which can be processed by the fourth class virtual environment library insertion module 27.

The fifth class includes window native APIs used to store, recover and delete registry when an application is executed. The window native APIs of the fifth class can be processed by the fifth class virtual registry storage module 28, the fifth class virtual registry recovery module 29 and the fifth class registry deletion module 30.

Functions, factors and return values of window native APIs used in Windows are well known in the art so that detailed explanations thereof are omitted.

Figure 6:
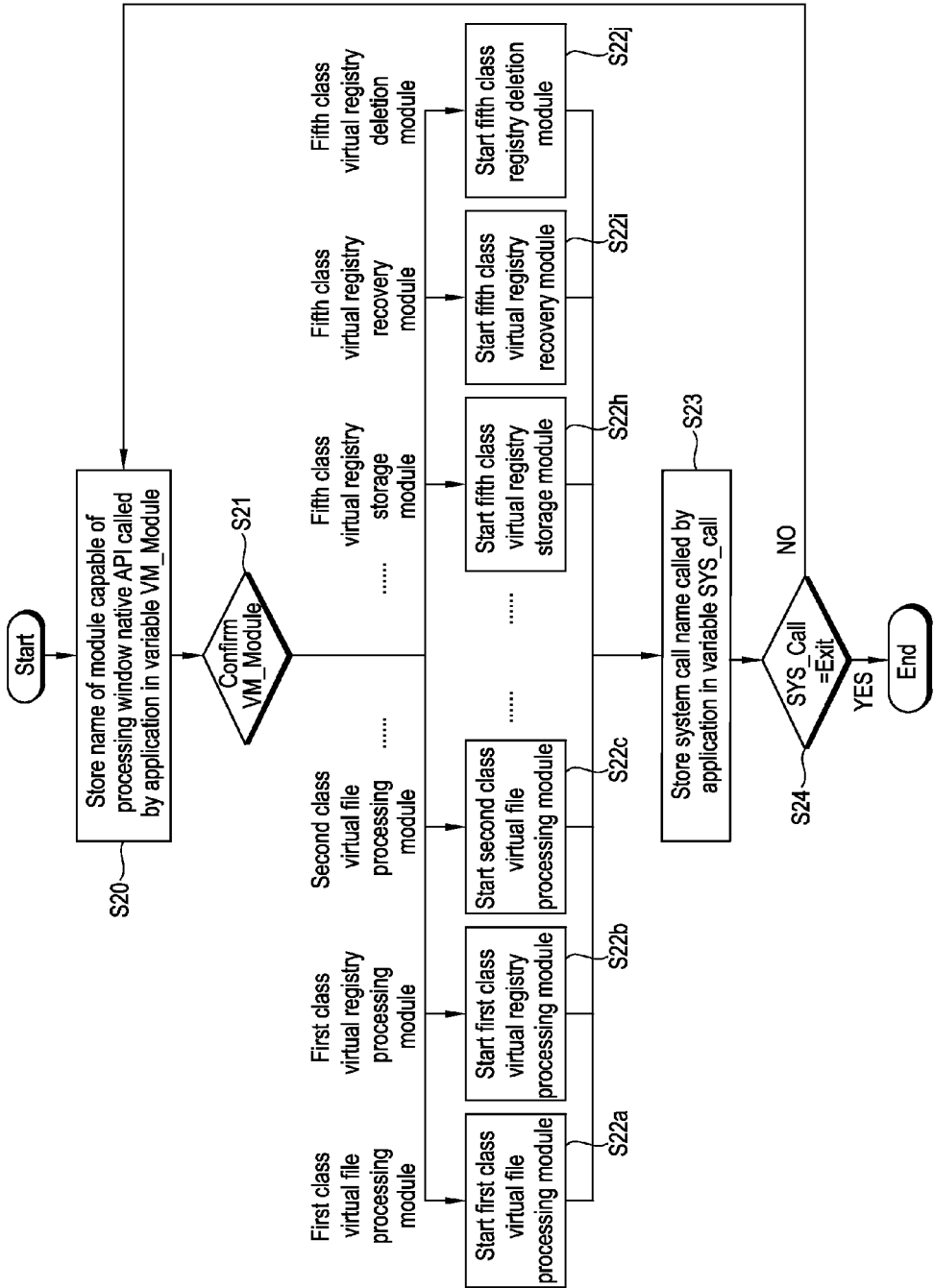
FIG. 6 is a flow chart showing a process of the virtual environment library block.

FIG. 6 is a flow chart showing a process of the virtual environment library block 20.

Referring to FIG. 6, the virtual environment library block 20 finds a module capable of virtualizing and processing a specific window native API (for example, NTDLL function) when the specific window native API is called by a virtual application.

Specifically, when the specific window native API is called by the virtual application, the virtual environment library block 20 stores the name of the module capable of processing the called window native API in a variable "VM_Module" in step S20, confirms which module corresponds to "VM_Module" in step S21, and then starts the corresponding module in step 22a, 22b, 22c, 22h, 22i or 22j.

Subsequently, a system call name called by the virtual application is stored in a variable "Sys_Call" that represents status in step S23 and the process of the virtual environment library block 20 is ended when the variable "Sys_Call" indicates "exit" in step S24.

Figure 7:
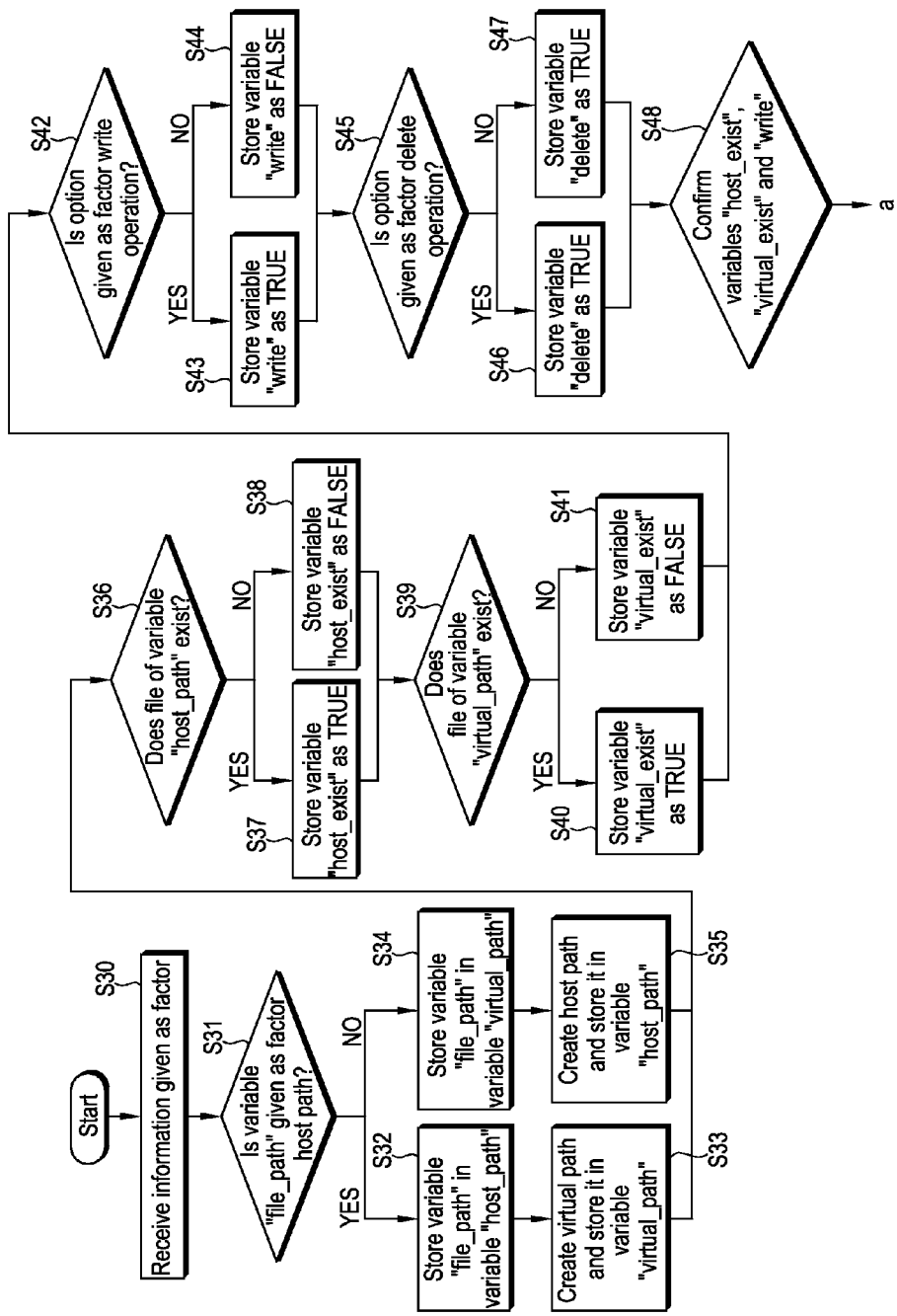
FIGS. 7 and 8 are flow charts showing the operation of a first class virtual file processing module of the virtual environment library block.
Figure 8:
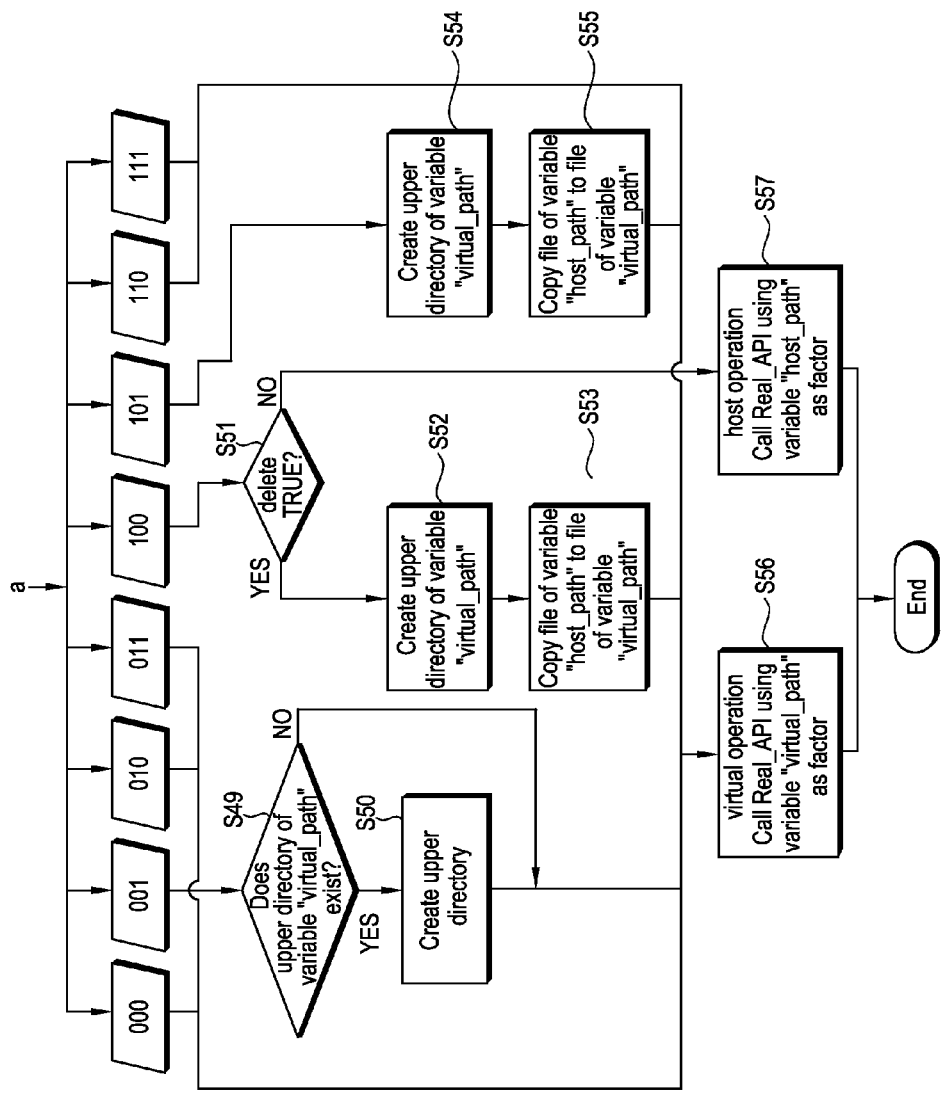

FIGS. 7 and 8 are flow chart showing the operation of the first class virtual file processing module 21 of the virtual environment library block 20.

The operation of the first class virtual file processing module 21 illustrated in FIGS. 7 and 8 are performed when file related APIs among the window native APIs of the first class are called while a virtual application is installed or executed. The file related window native APIs of the first class include "ZwCreateFile", "ZwOpenFile", "ZwDeleteFile", "ZwQueryAttributesFile", "ZwQueryFullAttributesFile", etc. The first class virtual file processing module 21 processes factors and call such that the factors and call are suited to a virtual environment.

When a procedure is started, the first class virtual file processing module 21 receives information in the form of factors in step S30 and confirms whether file path information given as a factor, for example, variable "file_path", is a host path or a virtual path in step S31. Here, the variable "file_path" is one of information included in "POBJECT_ATTRIBUTES ObjectAttributes" received as a factor of the window native APIs belonging to the first class.

When the file path given as a factor corresponds to the host path, the first class virtual file processing module 21 stores the corresponding path in a variable "host_path" in step S32, creates a virtual path and stores the virtual path in a variable "virtual_path" in step S33. When the file path given as a factor corresponds to the virtual path, the variable "file_path" is stored in the variable "virtual_path" in step S34 and a host path is created and stored in the variable "host_path" in step S35.

Subsequently, the first class virtual file processing module 21 confirms whether the file of the variable "host_path" exists in step S36, stores the value of a variable "host_exist" as "TRUE" (for example "1") when the file of the variable "host_path" exists in step S37, and stores the value of the variable "host_exist" as "FALSE" (for example "0") when the file of the variable "host_path" does not exist in step S38.

Furthermore, the first class virtual file processing module 21 confirms whether the file of the variable "virtual_path" exists in step S39, stores a variable "virtual_exist" as "1" that is a logic value indicating "TRUE" when the file of the variable "virtual_path" exists in step S40, and stores the variable "virtual_exist" as "0" that is a logic value indicating "FALSE" when the file of the variable "virtual_path" does not exist in step S41. While "1" is used as a logic value indicating "TRUE" and "0" is used as a logic value indicating "FALSE" in the current embodiment of the invention, "1" is used as a logic value indicating "FALSE" and "0" is used as a logic value indicating "TRUE" or other codes can be used as logic values indicating "TRUE" and "FALSE".

The first class virtual file processing module 21 confirms whether an option given as a factor corresponds to a write operation in step S42, stores a variable "write" as a logic value "1" indicating "TRUE" when the option corresponds to the write operation in step S43, and stores the variable "write" as a logic value "0" indicating "FALSE" when the option does not correspond to the write operation in step S44.

Furthermore, the first class virtual file processing module 21 confirms whether the option given as a factor corresponds to a delete operation in step S45, stores a variable "delete" as a logic value "1" indicating "TRUE" when the option corresponds to the delete operation in step S46, and stores the variable "delete" as a logic value "0" indicating "FALSE" when the option does not correspond to the delete operation in step S47.

Then, the first class virtual file processing module 21 confirms the variables "host_exist", "virtual_exist" and "write" in step S48.

When it is confirmed that the variables "host_exist", "virtual_exist" and "write" are "001" (that is, "host_exist" is 0, "virtual_exist" is 0 and "write" is 1), the first class virtual file processing module 21 confirms whether an upper directory of the variable "virtual_path" exists in step S49, creates the upper directory when the upper directory of the variable "virtual_path" exists in step S50, and calls Real_API using the variable "virtual_path" as a factor in step S56. Here, Real_API can be a window native API of the first class, which is called by a virtual application to perform a specific function. When the upper directory of the variable "virtual_path" does not exist, the first class virtual file processing module 21 directly calls Real_API using the variable "virtual_path" as a factor without creating the upper directory in step S56.

When the variables "host_exist", "virtual_exist" and "write" are "100" (that is, "host_exist" is 1, "virtual_exist" is 0 and "write" is 0), the first class virtual file processing module 21 confirms whether the variable "delete" is "TRUE" in step S51, creates an upper directory of the variable "virtual_path" when the variable "delete" is "TRUE" in step S52, copies the file of the variable "host_path" to the file of the variable "virtual_path" in step S53, and calls Real_API using the variable "virtual_path" as a factor in step S56. When the variable "delete" is "FALSE", the first class virtual file processing module 21 calls Real_API using the variable "host_path" as a factor when the variable "delete" is "FALSE" in step S57.

When the variables "host_exist", "virtual_exist" and "write" are "101" (that is, "host_exist" is 1, "virtual_exist" is 0 and "write" is 1), the first class virtual file processing module 21 creates an upper directory of the variable "virtual_path" in step S54, copies the file of the variable "host_path" to the file of the variable "virtual_path" in step S55, and calls Real_API using the variable "virtual_path" as a factor in step S56.

When the variables "host_exist", "virtual_exist" and "write" are "000", "010", "011", "110" and "111", the first class virtual file processing module 21 directly calls Real_API using the variable "virtual_path" as a factor in step S56.

Figure 9:
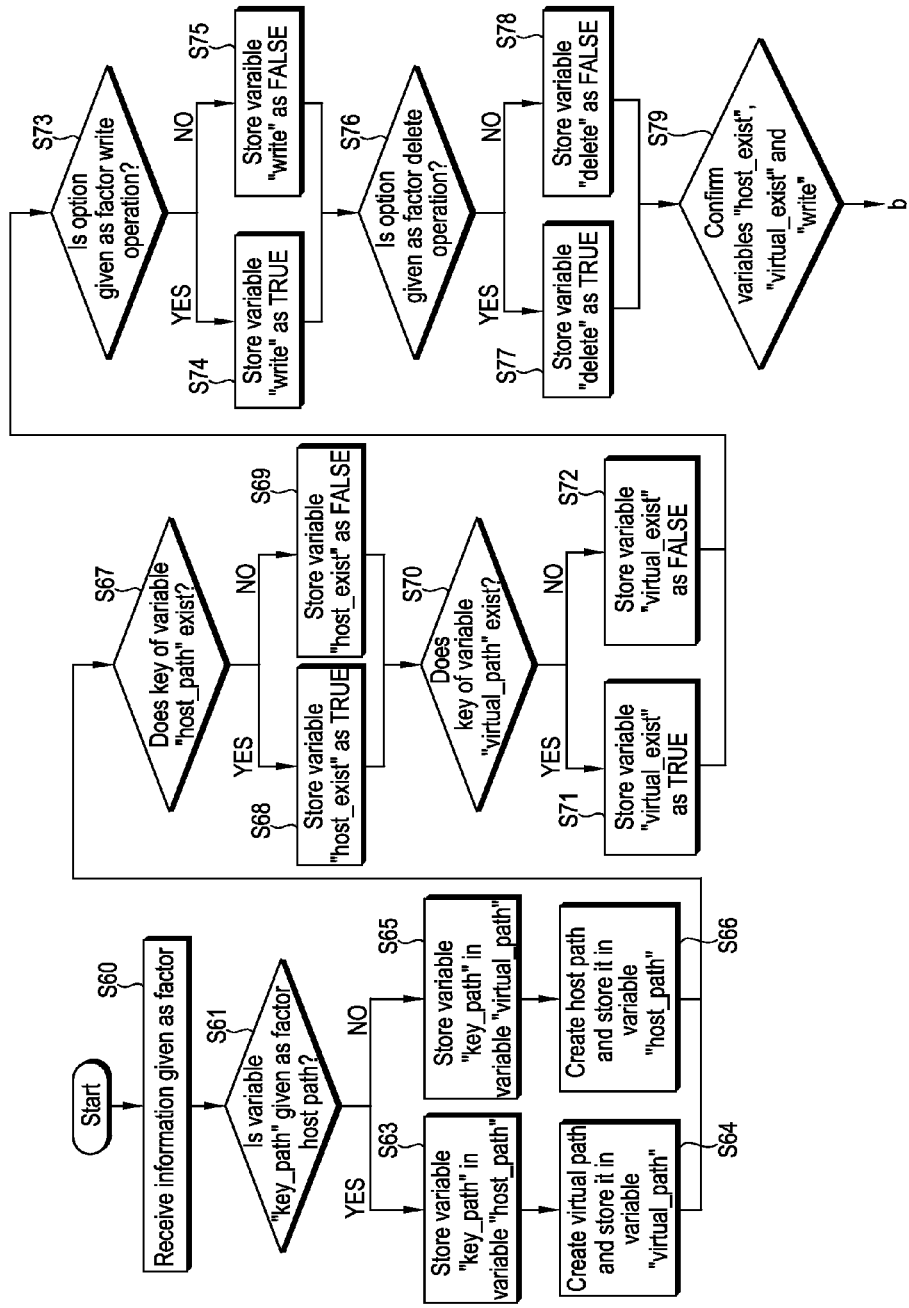
FIGS. 9 and 10 are flow charts showing the operation of a first class virtual registry processing module of the virtual environment library block.
Figure 10:
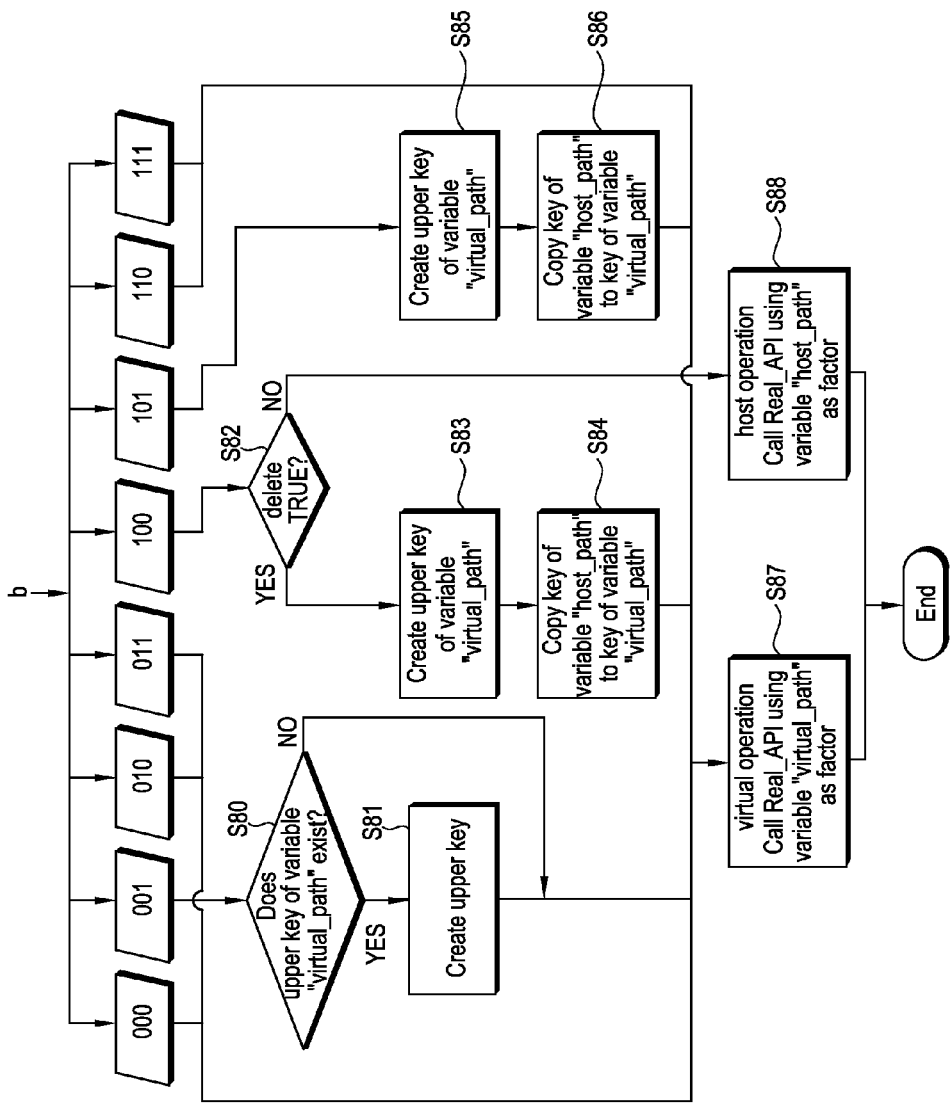

FIGS. 9 and 10 are flow charts showing the operation of the first class virtual registry processing module 22 of the virtual environment library block 20.

The operation of the first class virtual registry processing module 22 illustrated in FIGS. 9 and 10 are performed when registry related APIs among the window native APIs of the first class are called while a virtual application is installed and executed. The registry related APIs of the first class include "ZwCreateKey", "ZwOpenKey", "ZwDeleteKey", etc. The first class virtual registry processing module 22 processes factors and calls such that the factors and calls are suited to a virtual environment.

When a procedure is started, the first class virtual registry processing module 22 receives information given as factors in step S60 and confirms whether key path information given as a factor, for example, a variable "key_path", is a host path or a virtual path in step S61. Here, the variable "key_path" is one of information included in "POBJECT_ATTRIBUTES ObjectAttributes" received as a factor of window native APIs belonging to the first class.

When the key path given as a factor is a host path, the first class virtual registry processing module 22 stores the corresponding variable "key_path" in the variable "host_path" in step S63, creates a virtual path and stores the virtual path in the variable "virtual_path" in step S64. When the key path given as a factor is a virtual path, the first class virtual registry processing module 22 stores the variable "file_path" "key_path" in the variable "virtual_path" in step S65, creates a host path and stores the host path in the variable "host_path" in step S66.

Subsequently, the first class virtual registry processing module 22 confirms whether a key of the variable "host_path" exists in step S67, stores the variable "host_exist" as a logic value "1" that indicates "TRUE" when the key of the variable "host_path" exists in step S68 and stores the variable "host_exist" as a logic value "0" that indicates "FALSE" when the key of the variable "host_path" does not exist in step S69.

In addition, the first class virtual registry processing module 22 confirms whether a key of the variable "virtual_path" exists in step S70, stores the variable "virtual_exist" as a logic value "1" that indicates "TRUE" when the key of the variable "virtual_path" exists in step S71 and stores the variable "virtual_exist" as a logic value "0" that indicates "FALSE" when the key of the variable "virtual_path" does not exist in step S72.

The first class virtual registry processing module 22 confirms whether an option given as a factor corresponds to a write operation in step S73, stores the variable "write" as a logic value "1" that indicates "TRUE" when the option corresponds to the write operation in step S74 and stores the variable "write" as a logic value "0" that indicates "FALSE" when the option does not correspond to the write operation in step S75.

Furthermore, the first class virtual registry processing module 22 confirms whether the option given as a factor corresponds to a delete operation in step S76, stores the variable "delete" as a logic value "1" that indicates "TRUE" when the option corresponds to the delete operation in step S77 and stores the variable "delete" as a logic value "0" that indicates "FALSE" when the option does not correspond to the delete operation in step S78.

Then, the first class virtual registry processing module 22 confirms the variables "host_exist", "virtual_exist" and "write" in step S79.

When it is confirmed that the variables "host_exist", "virtual_exist" and "write" are "001", the first class virtual registry processing module 22 confirms whether an upper key of the variable "virtual_path" exists in step S80, creates the upper key when the upper key of the variable "virtual_path" exists in step S81, and then calls Real_API using the variable "virtual_path" as a factor in step S87. Here, Real_API can be a window native API of the first class, which is called by a virtual application to perform a specific function. When the upper key of the variable "virtual_path" does not exist, the first class virtual registry processing module 22 directly calls Real_API using the variable "virtual_path" as a factor without creating the upper key in step S87.

When the variables "host_exist", "virtual_exist" and "write" are "100", the first class virtual registry processing module 22 confirms whether the variable "delete" is "TRUE" in step S82, creates an upper key of the variable "virtual_path" when the variable "delete" is "TRUE" in step S83, copies the key of the variable "host_path" to the key of the variable "virtual_path" in step S84, and then calls Real_API using the variable "virtual_path" as a factor in step S87. When the variable "delete" is "FALSE", the first class virtual registry processing module 22 calls Real_API using the variable "host_path" as a factor when the variable "delete" is "FALSE" in step S88.

When the variables "host_exist", "virtual_exist" and "write" are "101", the first class virtual registry processing module 22 creates an upper key of the variable "virtual_path" in step S85, copies the key of the variable "host_path" to the key of the variable "virtual_path" in step S86, and then calls Real_API using the variable "virtual_path" as a factor in step S87.

When the variables "host_exist", "virtual_exist" and "write" are "000", "010", "011", "110" and "111", the first class virtual registry processing module 22 directly calls Real_API using the variable "virtual_path" as a factor in step S87.

Figure 11:
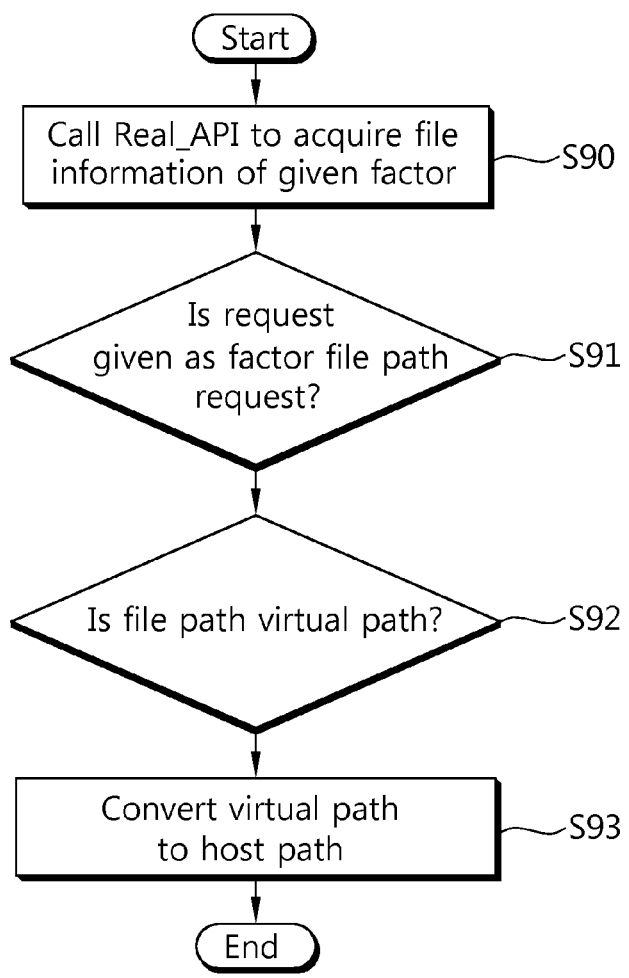
FIG. 11 is a flow chart showing the operation of a second class virtual file processing module of the virtual environment library block.

FIG. 11 is a flow chart showing the operation of the second class virtual file processing module 23 of the virtual environment library block 20.

The operation of the second class virtual file processing module 23 illustrated in FIG. 11 is performed when the file related APIs among the window native APIs of the second class is called while a virtual application is installed or executed. The file related window native APIs of the second class include "ZwQueryInformationFile", "ZwSetInformationFile", etc. The second class virtual file processing module 23 processes calls, data acquisition and data return such that the calls and data are suited to a virtual environment.

When a procedure is started, the second class virtual file processing module 23 calls Real_API to fetch file information of a given factor in step S90. That is, the second class virtual file processing module 23 receives the factor of Real_API. Here, Real_API can be a file related window native API of the second class, which is called by a virtual application to execute a specific function.

Subsequently, the second class virtual file processing module 23 confirms whether a request given as a factor includes information on a file path in step S91 and ends the procedure when the request given as a factor does not include the information on the file path. The second class virtual file processing module 23 confirms whether the file path is a virtual path when the request given as a factor includes the information on the file path in step S92 and converts the virtual path into a host path when the file path is the virtual path in step S93.

Figure 12:
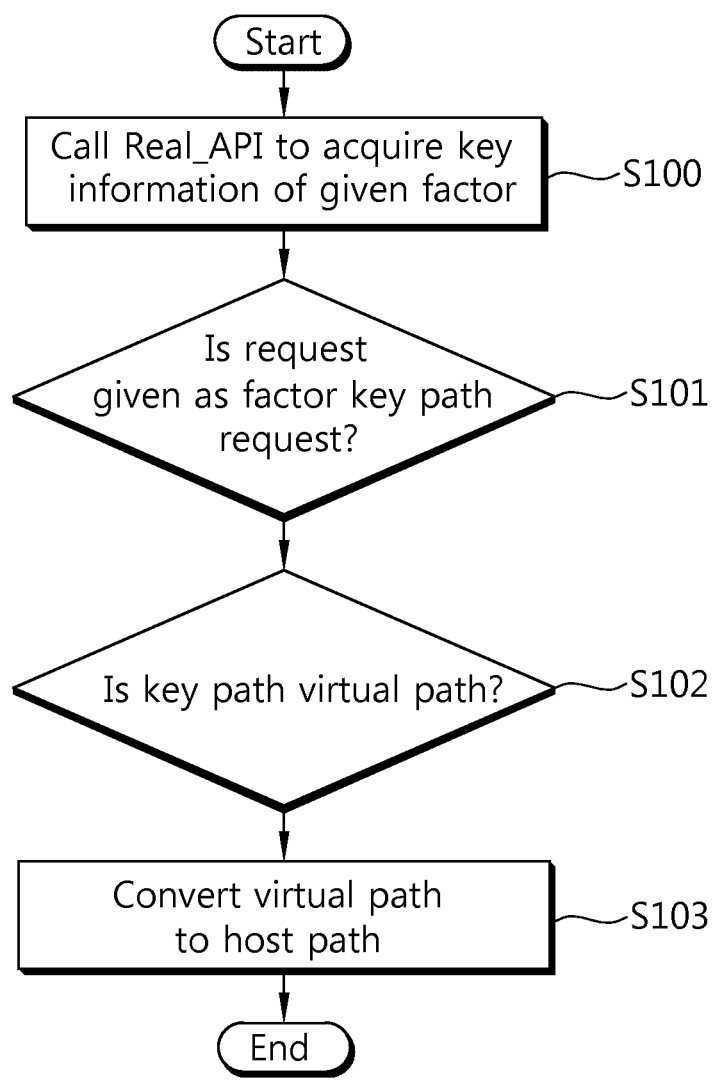
FIG. 12 is a flow chart showing the operation of a second class virtual registry processing module of the virtual environment library block.

FIG. 12 is a flow chart showing the operation of the second class virtual registry processing module 24 of the virtual environment library block 20.

The operation of the second class virtual registry processing module 24 shown in FIG. 12 is performed when the registry related APIs among the window native APIs of the second class are called while a virtual application is installed or executed. The registry related window native APIs of the second class include "ZwQueryKey" and so on. The second class virtual registry processing module 24 processes calls, data acquisition and data return such that the calls and data are suited to a virtual environment.

When a procedure is started, the second class virtual registry processing module 24 calls Real_API to fetch key information of a given factor in step S100. Here, Real_API can be a registry related window native API of the second class, which is called by a virtual application to execute a specific function.

Subsequently, the second class virtual registry processing module 24 confirms whether a request given as a factor includes information on a key path in step S101 and ends the procedure when the request given as a factor does not include the information on the key path. The second class virtual registry processing module 24 confirms whether the key path is a virtual path when the request given as a factor includes the information on the key path in step S102 and converts the virtual path into a host path when the key path is the virtual path in step S103.

Figure 13:
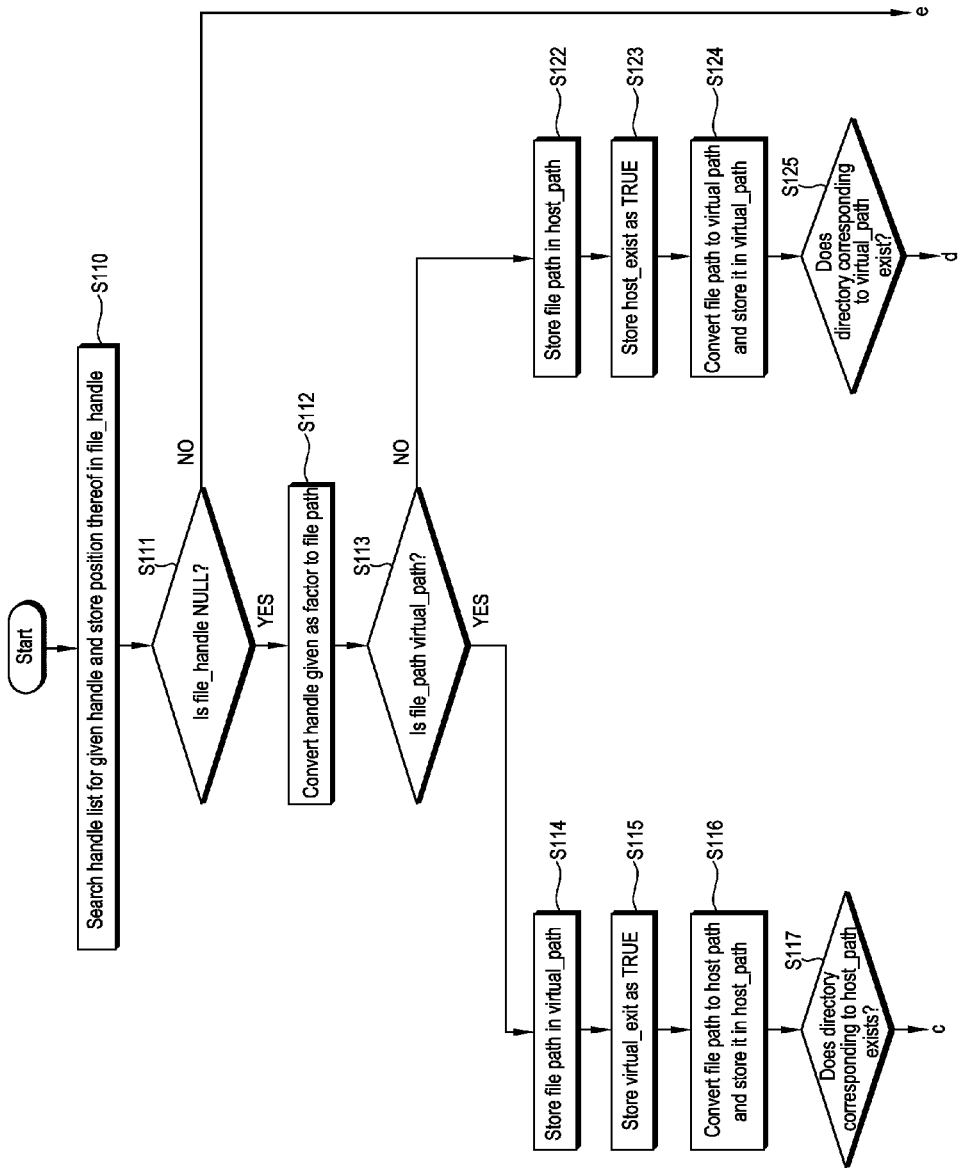
FIGS. 13 and 14 are flow charts showing the operation of a third class virtual file processing module of the virtual environment library block.
Figure 14:
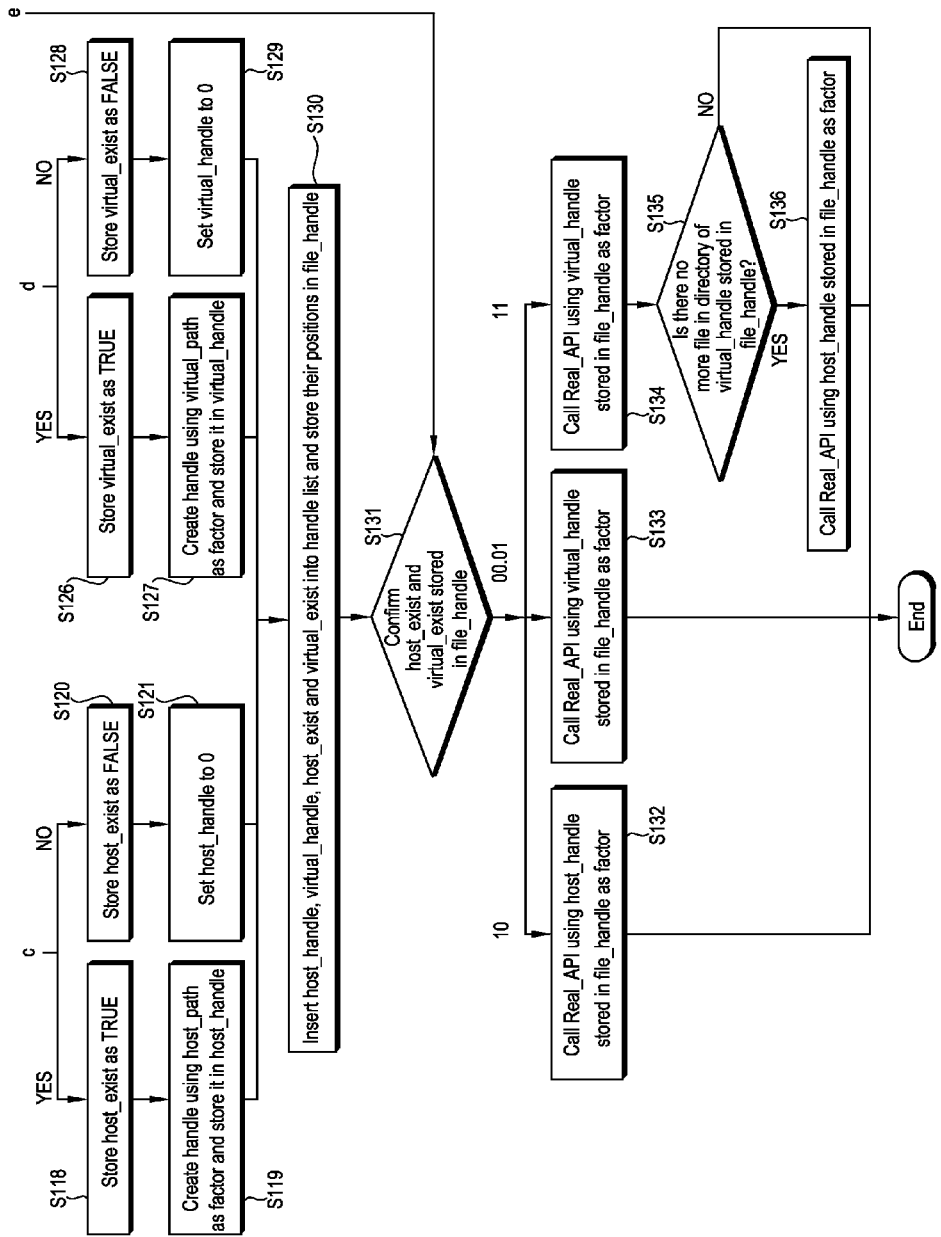

FIGS. 13 and 14 are flow charts showing the operation of the third class virtual file processing module 25 of the virtual environment library block 20.

The operation of the third class virtual file processing module 25 shown in FIGS. 13 and 14 is performed when the file related APIs among the window native APIs of the third class are called while a virtual application is installed or executed. The file related window native APIs of the third class include "ZwQueryDirectoryFile", "ZwClose" and so on. The third class virtual file processing module 25 processes a plurality of calls and combines the results.

When a procedure is started, the third class virtual file processing module 25 searches a handle list for a given handle and stores the position of the handle in "file_handle" in step S110. The handle list is information included in a given factor. The third class virtual file processing module 25 confirms whether "file_handle" is NULL in step S111, confirms the variable stored in "file_handle" when "file_handle" is not NULL in step S131 and converts the handle into a file path when "file_handle" is NULL in step S112.

Then, the third class virtual file processing module 25 confirms whether the converted file path is a virtual path in step S113.

When the file path is the virtual path, the third class virtual file processing module 25 stores the virtual path in the variable "virtual_path" in step S114, sets the variable "virtual_exist" as a logic value "1" that indicates "TRUE" in step S115, converts the file path into a host path and stores the host path in "host_path" in step S116. Subsequently, the third class virtual file processing module 25 confirms whether a directory corresponding to the stored variable "host_path" exists in step S117, sets the variable "host_exist" as a logic value "1" that indicates "TRUE" when the directory exists in step S118, creates a handle using the variable "host_path" as a factor and stores the handle in a variable "host_handle" in step S119. When the directory corresponding to the stored variable "host_path" does not exist, the third class virtual file processing module 25 sets the variable "host_exist" to a logic value "0" that indicates "FALSE" in step S120 and sets the variable "host_handle" to "0" in step S121.

When the converted file path is a host path, the third class virtual file processing module 25 stores the host path in the variable "host_path" in step S122, sets the variable "host_exist" to a logic value "1" that indicates "TRUE" in step S123, converts the file path to a virtual path and stores the virtual path in "virtual_path" in step S124. Then, the third class virtual file processing module 25 confirms whether a directory corresponding to the stored variable "virtual_path" exists in step S125, sets the variable "virtual_exist" to a logic value "1" that indicates "TRUE" when the directory exists in step S126, creates a handle using the "virtual_path" as a factor and stores the handle in a variable "virtual_handle" in step S127. When the directory corresponding to the stored variable "virtual_path" does not exist, the third class virtual file processing module 25 sets the variable "virtual_exist" to a logic value "0" that indicates "FALSE" in step S128 and sets the variable "virtual_handle" to "0" in step S129.

Subsequently, the third class virtual file processing module 25 inserts the values of the variables "host_handle", "virtual_handle", "host_exist" and "virtual_exist" into the handle list and stores their positions in the variable "file_handle" in step S130.

Then, the third class virtual file processing module 25 confirms the values of "host_exist" and "virtual_exist" stored in "file_handle" in step S131.

When "host_exist" and "virtual_exist" are "10" (that is, when "host_exist" is "1" and "virtual_exist" is "0"), the third class virtual file processing module 25 calls Real API using "host_handle" stored in the variable "file_handle" as a factor in step S132. Here, Real_API is a file related window native API of the third class, which is called by a virtual application to perform a specific function.

When the confirmed "host_exist" and "virtual_exist" are "00" or "01", the third class virtual file processing module 25 calls Real_API using "virtual_handle" stored in the variable "file_handle" as a factor in step S133. When the confirmed "host_exist" and "virtual_exist" are "11", the third class virtual file processing module 25 calls Real_API in step S134, confirms whether there is no more file in the directory of "virtual_handle" stored in "file_handle" in step S135 and calls Real_API using "host_handle" stored in "file_handle" as a factor when there is no more file in the directory of "virtual_handle" stored in "file_handle" in step S136.

Figure 15:
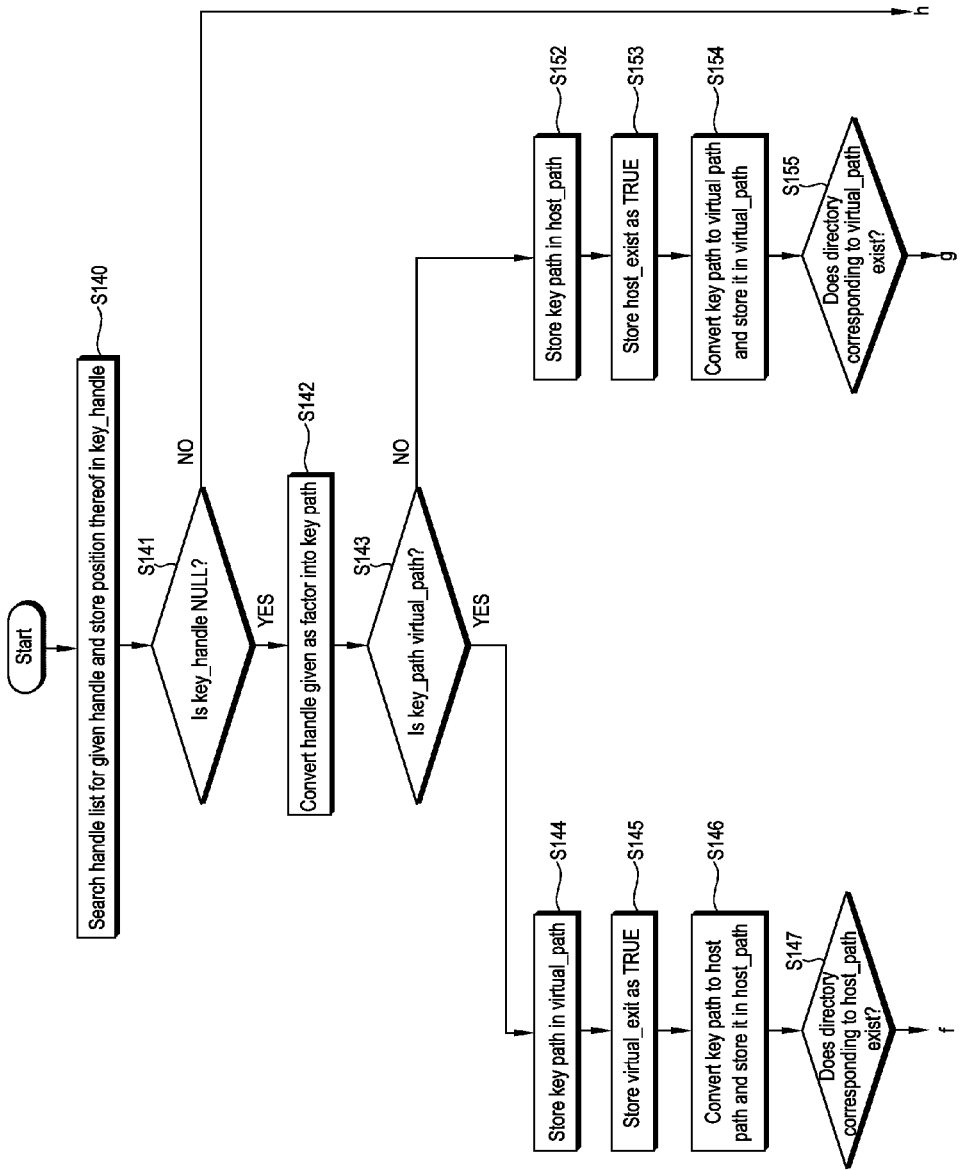
FIGS. 15 and 16 are flow charts showing the operation of a third class virtual registry processing module of the virtual environment library block.
Figure 16:
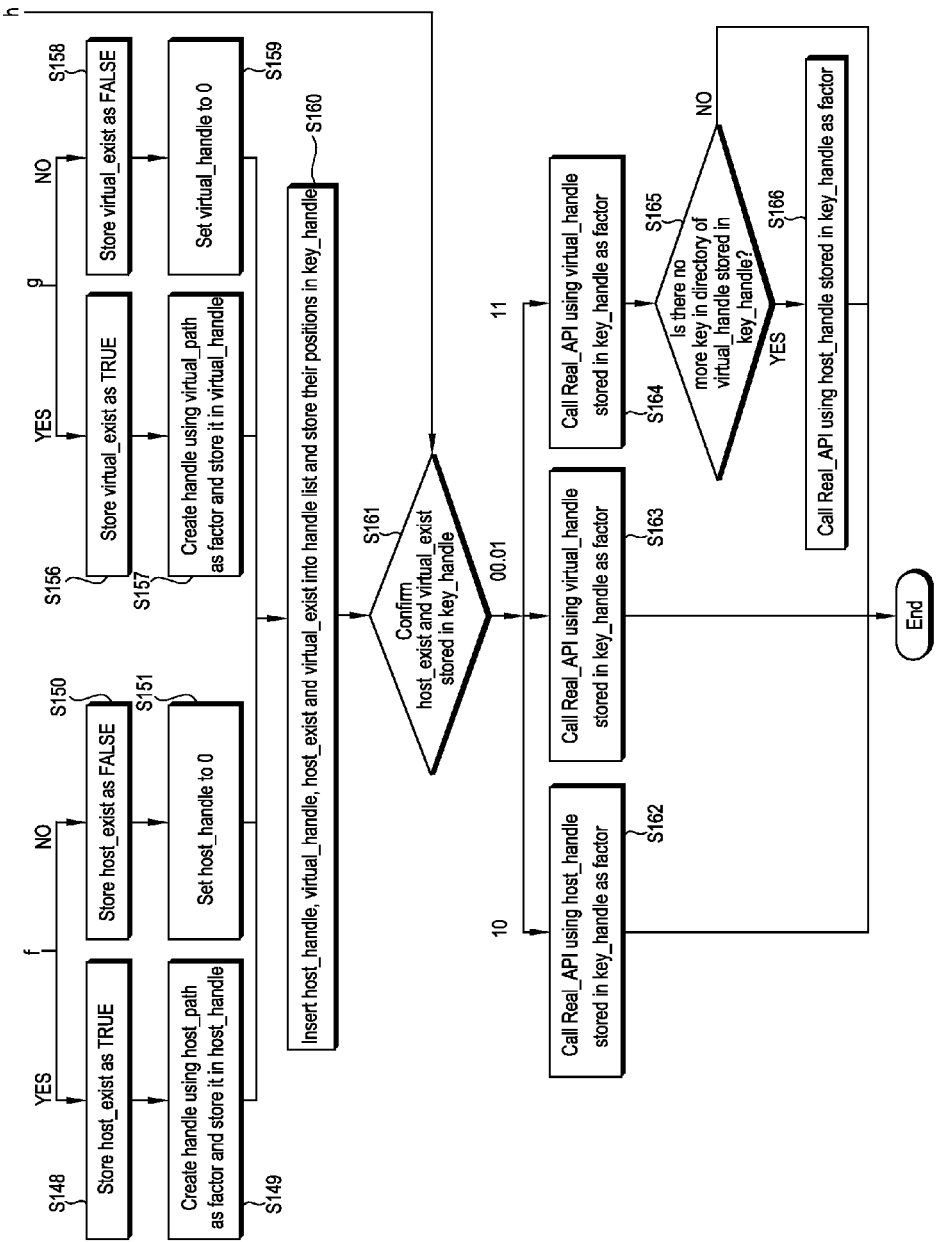

FIGS. 15 and 16 are flow charts showing the operation of the third class virtual registry processing module 26 of the virtual environment library block 20.

The operation of the third class virtual registry processing module 26 shown in FIGS. 15 and 16 is performed when a registry related API among the window native APIs of the third class is called while a virtual application is installed or executed. The registry related window native API of the third class includes "ZwEnumerateKey". The third class virtual registry processing module 26 processes a plurality of calls and combines the results.

When a procedure is started, the third class virtual registry processing module 26 searches the handle list for a given handle and stores the position of the handle in "key_handle" in step S140. The handle list is included in a given factor. The third class virtual registry processing module 26 confirms whether "key_handle" is NULL in step S141, confirms a variable stored in "key_handle" when "key_handle" is not NULL in step S161 and converts the handle into a key path when "key_handle" is NULL in step S142.

Then, the third class virtual registry processing module 26 confirms whether the converted key path is a virtual path in step S143.

When the key path is the virtual path, the third class virtual registry processing module 26 stores the virtual path in the variable "virtual_path" in step S144, sets the variable "virtual_exist" as a logic value "1" that indicates "TRUE" in step S145, converts the key path into a host path and stores the host path in "host_path" in step S146. Subsequently, the third class virtual registry processing module 26 confirms whether a directory corresponding to the stored variable "host_path" exists in step S147, sets the variable "host_exist" as a logic value "1" that indicates "TRUE" when the directory exists in step S148, creates a handle using the variable "host_path" as a factor and stores the handle in the variable "host_handle" in step S149. When the directory corresponding to the stored variable "host_path" does not exist, the third class virtual registry processing module 26 sets the variable "host_exist" to a logic value "0" that indicates "FALSE" in step S150 and sets the variable "host_handle" to "0" in step S151.

When the converted key path is a host path, the third class virtual registry processing module 26 stores the host path in the variable "host_path" in step S152, sets the variable "host_exist" to a logic value "1" that indicates "TRUE" in step S153, converts the key path to a virtual path and stores the virtual path in "virtual_path" in step S154. Then, the third class virtual registry processing module 26 confirms whether a key corresponding to the stored variable "virtual_path" exists in step S155, sets the variable "virtual_exist" to a logic value "1" that indicates "TRUE" when the key exists in step S156, creates a handle using the "virtual_path" as a factor and stores the handle in the variable "virtual_handle" in step S157. When the key corresponding to the stored variable "virtual_path" does not exist, the third class virtual registry processing module 26 sets the variable "virtual_exist" to a logic value "0" that indicates "FALSE" in step S158 and sets the variable "virtual_handle" to "0" in step S159.

Subsequently, the third class virtual registry processing module 26 inserts the variables "host_handle", "virtual_handle", "host_exist" and "virtual_exist" into the handle list and stores their positions in the variable "key_handle" in step S160.

Then, the third class virtual registry processing module 26 confirms the values of "host_exist" and "virtual_exist" stored in "key_handle" in step S161.

When "host_exist" and "virtual_exist" are "10" (that is, when "host_exist" is "1" and "virtual_exist" is "0"), the third class virtual registry processing module 26 calls Real_API using "host_handle" stored in the variable "key_handle" as a factor in step S162. Here, Real_API is a file related window native API of the third class, which is called by a virtual application to perform a specific function.

When the confirmed "host_exist" and "virtual_exist" are "00" or "01", the third class virtual registry processing module 26 calls Real_API using "virtual_handle" stored in the variable "key_handle" as a factor in step S163. When the confirmed "host_exist" and "virtual_exist" are "11", the third class virtual registry processing module 26 calls Real_API in step S164, confirms whether there is no more key existing in the key of "virtual_handle" stored in "key_handle" in step S165 and calls Real_API using "host_handle" stored in "key_handle" as a factor when there is no more key existing in the key of "virtual_handle" stored in "key_handle" in step S166.

Figure 17:
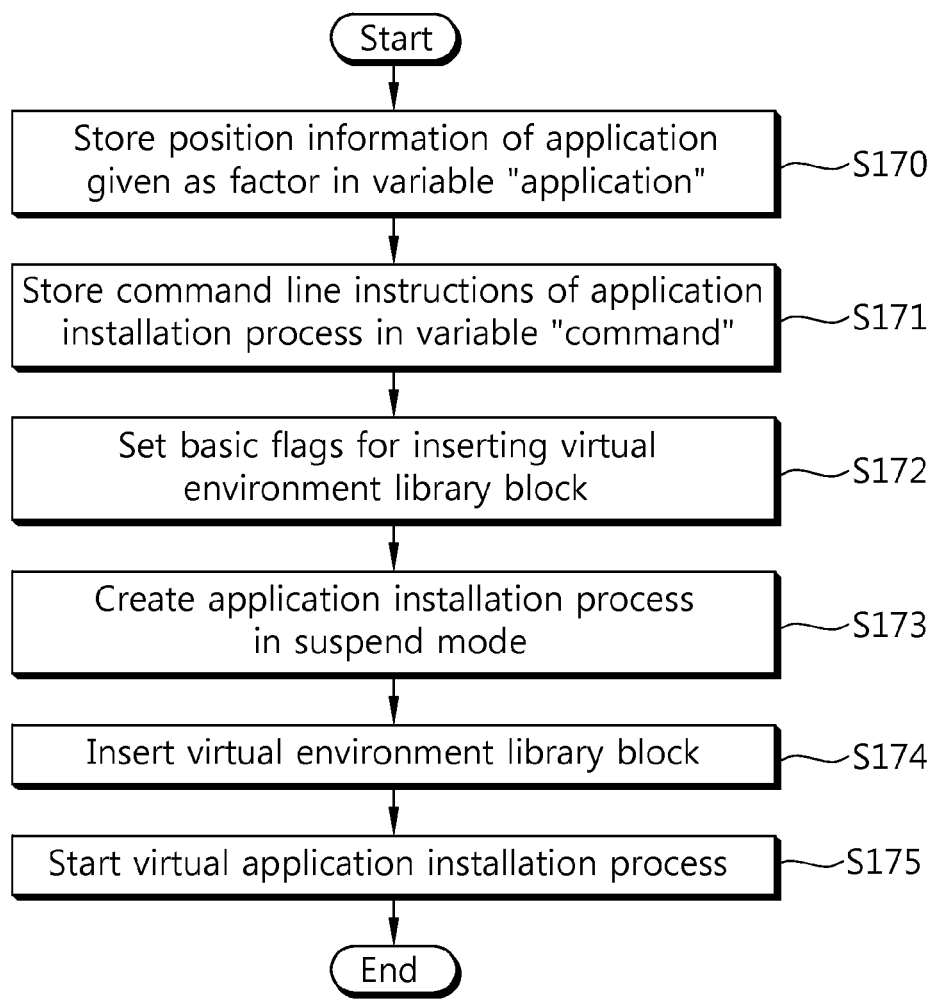
FIG. 17 is a flow chart showing the operation of a fourth class virtual environment library insertion module of the virtual environment library block.

FIG. 17 is a flow chart showing the operation of the fourth class virtual environment library insertion module 27 of the virtual environment library block 20.

Referring to FIG. 17, the virtual application creating system 100 must modify an application installation process to convert it into a virtual application installation process in order to create a virtual execution environment. The window native API used by the application installation process is redirected according to the virtual environment library block 20, that is, "vm.dll". The fourth class virtual environment library insertion module 27 can process the redirection.

When a procedure is started, the fourth class virtual environment library insertion module 27 stores application position information given as a factor in the variable "application" in step S170. The application position information can be position information of the setup file of an application, that is, a path capable of finding the setup file of the application.

Then, the fourth class virtual environment library insertion module 27 retrieves the setup file of the application using the stored application position information, stores a command line instruction of an application installation process, which exists in the setup file, in a variable "command" in step S171, sets basic flags for inserting the virtual environment library block 20 in step S172, and then creates an application installation process in a suspend mode in step S173.

Subsequently, the fourth class virtual environment library insertion module 27 inserts the virtual environment library block 20 into the created application installation process in step S174 to convert the application installation process to a virtual application installation process, and then starts the virtual application installation process in step S175.

When an installed virtual application is executed, the virtual application must load a virtual registry file, for example, "vreg.reg" file, in a memory in order to newly start a virtual environment. When the virtual application is ended, registry files of all memories must be stored in "vreg.reg" in order to cancel the virtual environment. For these operations, the fifth class virtual registry storage module 28, the fifth class virtual registry recovery module 29 and the fifth class virtual registry deletion module 30 are used.

Figure 18:
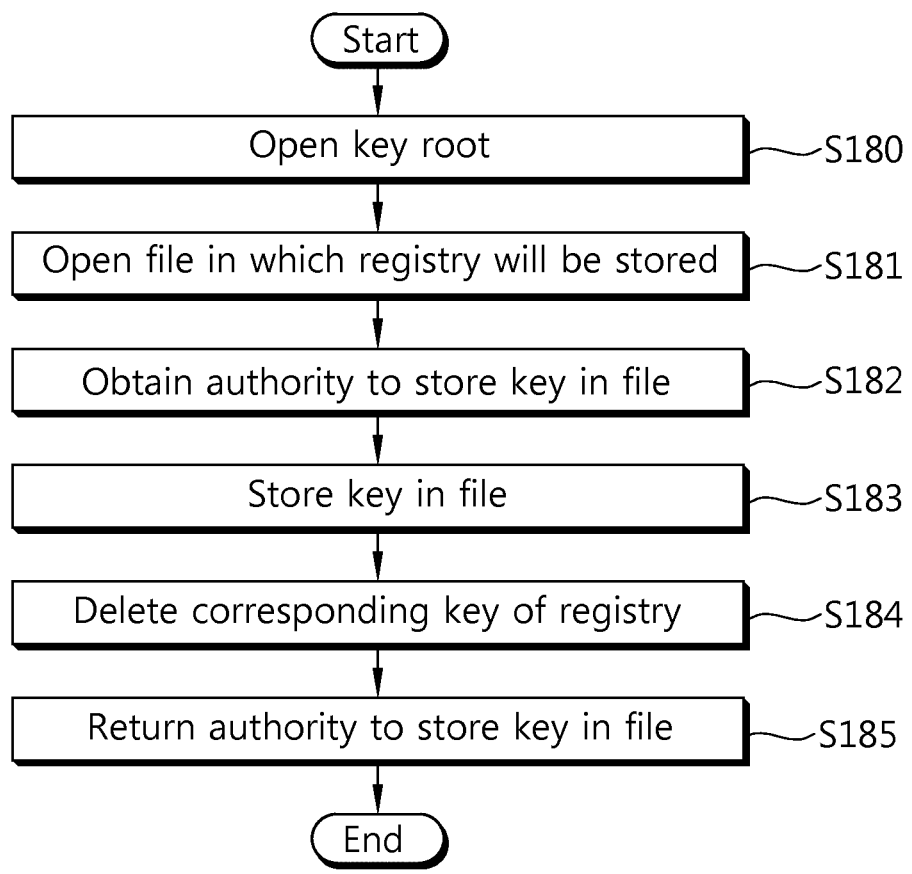
FIG. 18 is a flow chart showing the operation of a fifth class virtual registry storage module of the virtual environment library block.

FIG. 18 is a flow chart showing the operation of the fifth class virtual registry storage module 28 of the virtual environment library block 20.

Referring to FIG. 18, the fifth class virtual registry storage module 28 opens the key root of a specific key in step S180 and opens a file in which registry will be stored, for example, "vreg.reg" in step S181. Subsequently, the fifth class virtual registry storage module 28 acquires authority to store a key in a file from the manager of Windows that is an operating system in step S182 and stores the key in the file in step S183. Then, the fifth class virtual registry storage module 28 deletes the key from registry in step S184 and returns the key storage authority acquired from the manager in step S185.

Figure 19:
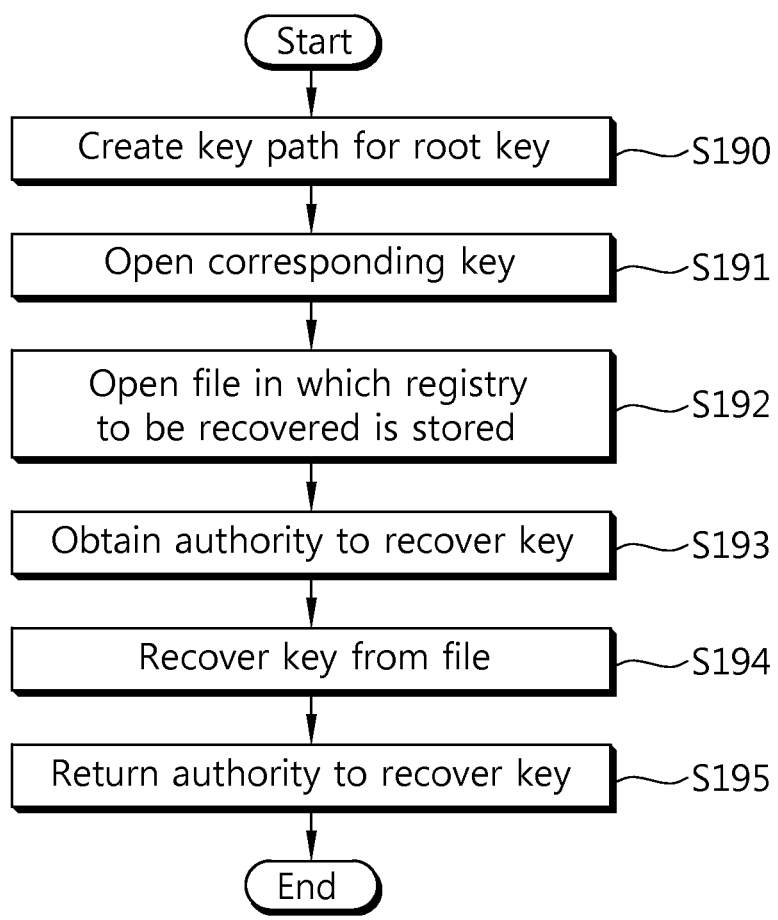
FIG. 19 is a flow chart showing the operation of a fifth class virtual registry deletion module of the virtual environment library block.

FIG. 19 is a flow chart showing the operation of the fifth class virtual registry recovery module 29 of the virtual environment library block 20. The fifth class virtual registry recovery module 29 creates a key path for a root key in step S190, opens a key (corresponding to the key path) in step S191, and then opens a file storing registry to be recovered in step S192. Subsequently, the fifth class virtual registry recovery module 29 acquires authority to recover a file from the window manager in step S193 and recovers the key from the file in step S194. Then, the fifth class virtual registry recovery module 29 returns the key recovery authority acquired from the manager in step S195.

Figure 20:
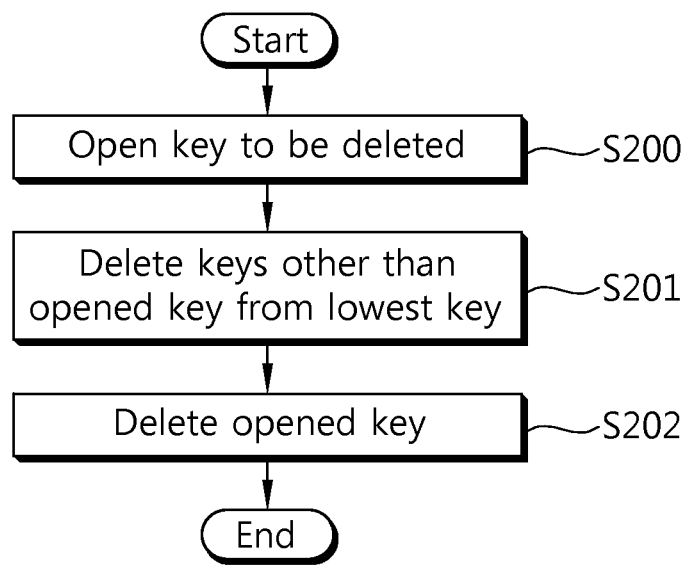
FIG. 20 is a flow chart showing the operation of a fifth class virtual registry deletion module of the virtual environment library block.

FIG. 20 is a flow chart showing the operation of the fifth class virtual registry deletion module 30 of the virtual environment library block 20.

Referring to FIG. 20, the fifth class virtual registry deletion module 30 opens a key to be deleted in step S200 and sequentially deletes keys other than the opened key from the lowest key in step S201. When all the lower keys are deleted, the fifth class virtual registry deletion module 30 deletes the opened key in step S202.

Figure 21:
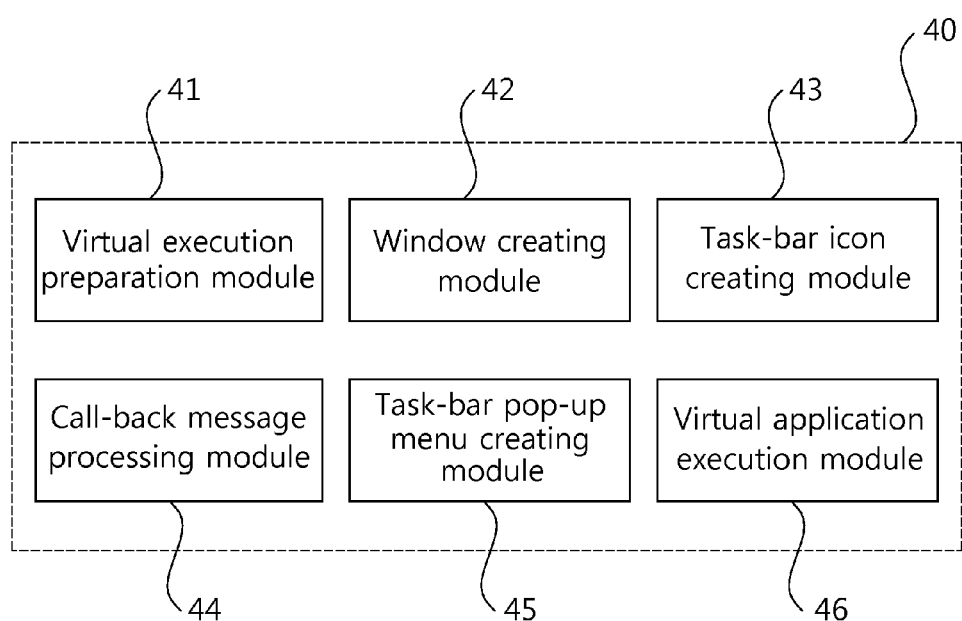
FIG. 21 is a block diagram of a virtual application execution block illustrated in FIG. 1.

FIG. 21 is a block diagram of the virtual application execution block 40 illustrated in FIG. 1.

Referring to FIG. 21, the virtual application execution block 40 executes a virtual application installed by the virtual application installation block 10 and provides additional functions required to execute the virtual application. The virtual application execution block 40 includes a virtual execution preparation module 41, a window creating module 42, a task-bar icon creating module 43, a call-back message processing module 44, a task-bar pop-up menu creating module 45 and a virtual application execution module 46.

After the virtual application is installed by the aforementioned virtual application installation module, when a user operates the virtual application execution block 40 in order to execute the virtual application, the virtual execution preparation module 41 starts to operate.

Figure 22:
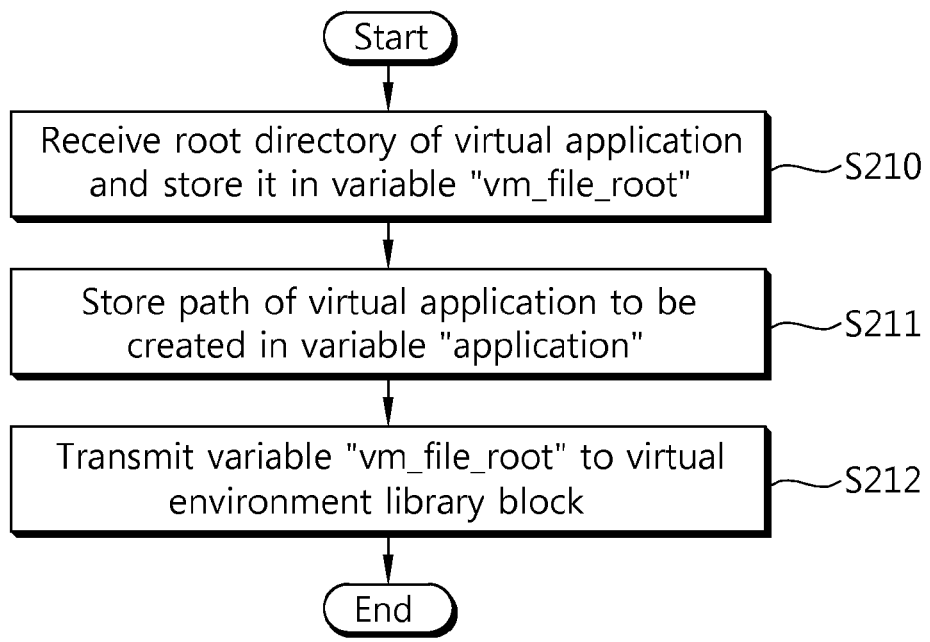
FIG. 22 is a flow chart showing the operation of a virtual execution preparation module of the virtual application execution block.

FIG. 22 is a flow chart showing the operation of the virtual execution preparation module 41 of the virtual application execution block 40.

Referring to FIG. 22, the virtual execution preparation module 41 receives place information of the virtual application to be executed, for example, information of the root directory of the virtual application, as a factor and stores the information in the variable "vm_file_root" in step S210. Then, the virtual execution preparation module 41 stores position information of the virtual application to be executed, that is, a path through which the virtual application can be accessed, in the variable "application" in step S211.

After the virtual execution preparation module 41 sets the variables "vm_file_root" and "application" for executing the virtual application, the virtual execution preparation module 41 transfers the variable "vm_file_root" to the virtual environment library block 20 in step S212 and ends the operation thereof. Upon the completion of the operation of the virtual execution preparation module 41, the window creating module 42 can operate.

Figure 23:
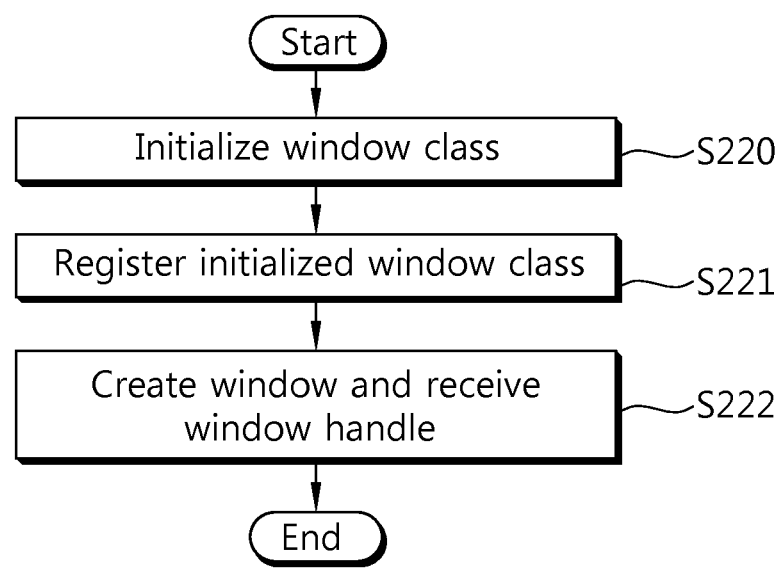
FIG. 23 is a flow chart showing the operation of a window creating module of the virtual application execution block.

FIG. 23 is a flow chart showing the operation of the window creating module 42 of the virtual application execution block 40.

Referring to FIG. 23, when a procedure is started, the window creating module 42 initializes a window class in step S220 and registers the initialized window class in step S221. Subsequently, the window creating module 42 creates a window and receives a window handle of the created window in step S222. This window creating process can conform to the procedure of the window creating API used in Windows that is an operating system. When the window handle is obtained through the operation of the window creation module 42, a virtual application execution related icon can be created in a task bar through the task-bar icon creation module 43.

Figure 24:
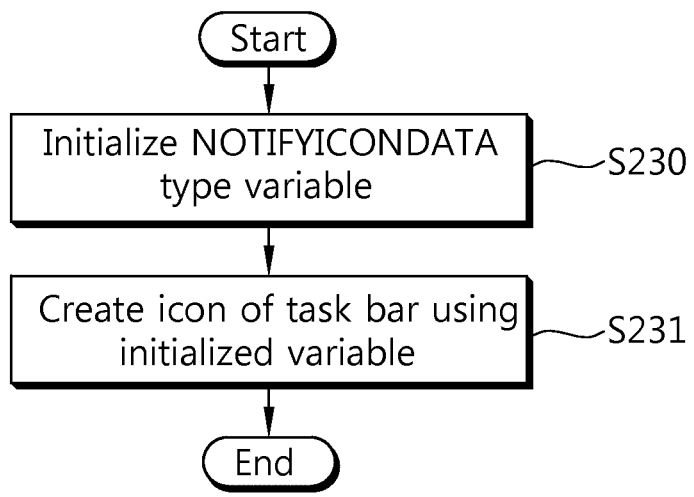
FIG. 24 is a flow chart showing the operation of a task-bar icon creating module of the virtual application execution block.

FIG. 24 is a flow chart showing the operation of the task-bar icon creating module 43.

Referring to FIG. 24, the task-bar icon creating module 43 initializes a "NOTIFYICONDATA" type variable in step S230. "NOTIFYICONDATA" is a structure used in native window and includes information such as a window handle. Then, the task-bar icon creating module 43 creates an icon of the virtual application execution block 40 in the task bar using the initialized "NOTIFYICONDATA" type variable in step S231.

When the user clicks the icon of the virtual application execution block 40, which is created as above (for example, when the user clicks the left button of a mouse), the call-back message processing module 44 can operate in order to determine an event that the user requires.

Figure 25:
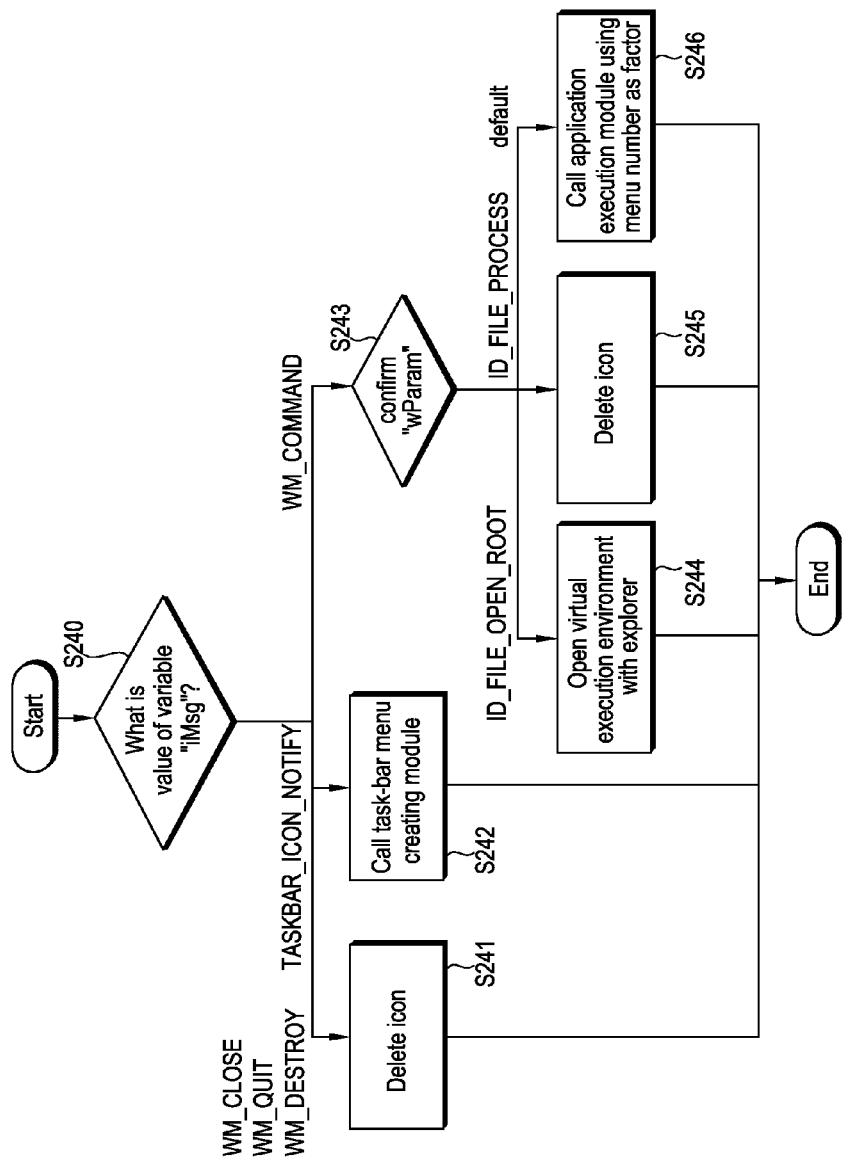
FIG. 25 is a flow chart showing the operation of a call-back message processing module of the virtual application execution block.

FIG. 25 is a flow chart showing the operation of the call-back message processing module 44 of the virtual application execution block 40.

Referring to FIG. 25, the call-back message processing module 44 confirms the value of a variable "iMsg" received as a factor in step S240. The variable "iMsg" includes information capable of identifying a message type and can be received as a factor according to clicking of a user.

When the variable "iMsg" has values "WM_CLOSE", "WM_QUIT" and "WM_DESTROY", the call-back message processing module 44 deletes the icon of the task bar (that is, the icon of the virtual application execution block) and ends the process of the virtual application execution block 40 in step S241. If the variable "iMsg" has a value "TASKBAR_ICON_NOTIFY", the call-back message processing module 44 calls the task-bar icon menu creating module in step S242.

When the variable "iMsg" has a value "WM_COMMAND", the call-back message processing module 44 confirms a variable "wParam" transferred as a factor in step S243, opens a virtual execution environment with the explorer when the variable "wParam" has a value "ID_FILE_OPEN_ROOT" in step S244, deletes the icon of the task bar when the variable "wParam" has a value "ID_FILE_KILL_PROCESS" and ends the process of the virtual application execution block 40 in step S245. The call-back message processing module 44 calls the virtual application execution module using a menu number as a factor when the variable "wParam" has a default value in step S246.

When the task-bar menu creating module is called by the call-back message processing module 44, the task-bar menu creating module can provide a pop-up menu by which a virtual application that the user wants to execute.

Figure 26:
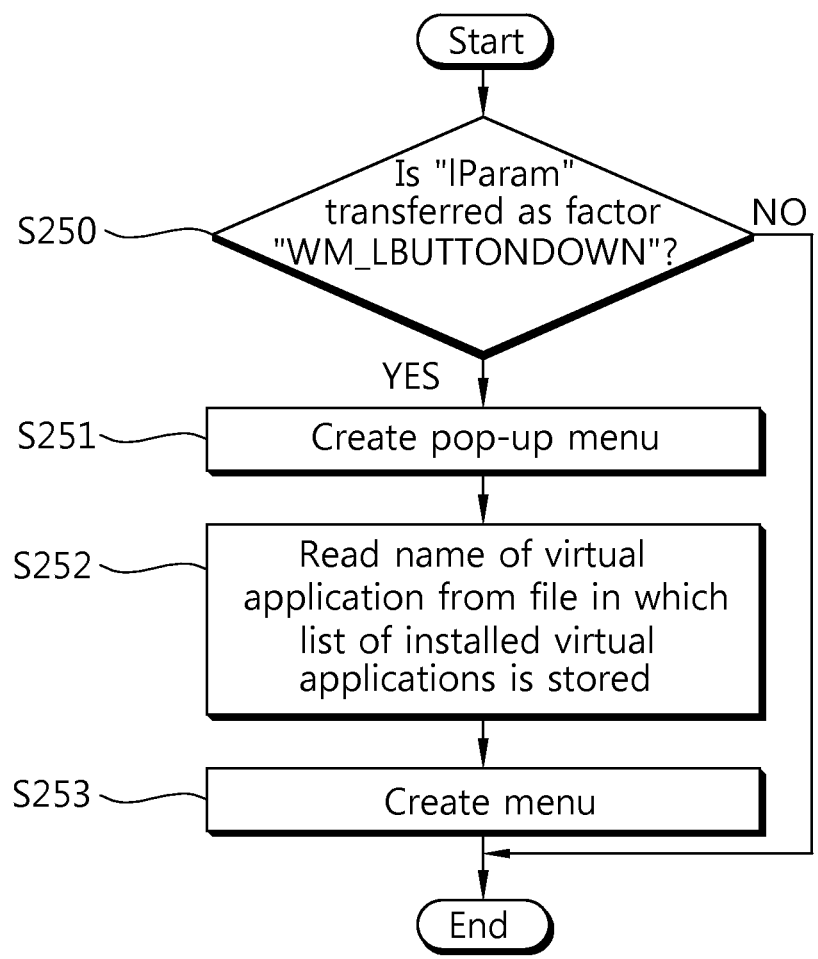
FIG. 26 is a flow chart showing the operation of a task-bar pop-up menu creating module of the virtual application execution block.

FIG. 26 is a flow chart showing the operation of the task-bar pop-up menu creating module 45 of the virtual application execution block 40.

Referring to FIG. 26, the task-bar pop-up menu creating module 45 confirms whether a variable "lParam" transferred as a factor is "WM_LBUTTONDOWN" in step S250. The variable "lParam" can be provided by the call-back message processing module 44 that calls the task-bar pop-up menu creating module 45. The native window API transmits additional information to "wParam" or "lParam" according to message type. Furthermore, "WM_LBUTTONDOWN" can be a message created when the user clicks the left button of a mouse.

When the variable "lParam" is "WM_LBUTTONDOWN", the task-bar pop-up menu creating module 45 creates a pop-up menu in step S251, retrieves the names of virtual applications from a file in which a list of installed virtual applications is stored in step S252, and creates a menu by which the virtual applications can be selected in the pop-up menu in step S253.

When the user selects a virtual application to be executed from the created pop-up menu, the virtual application execution module 46 operates.

Figure 27:
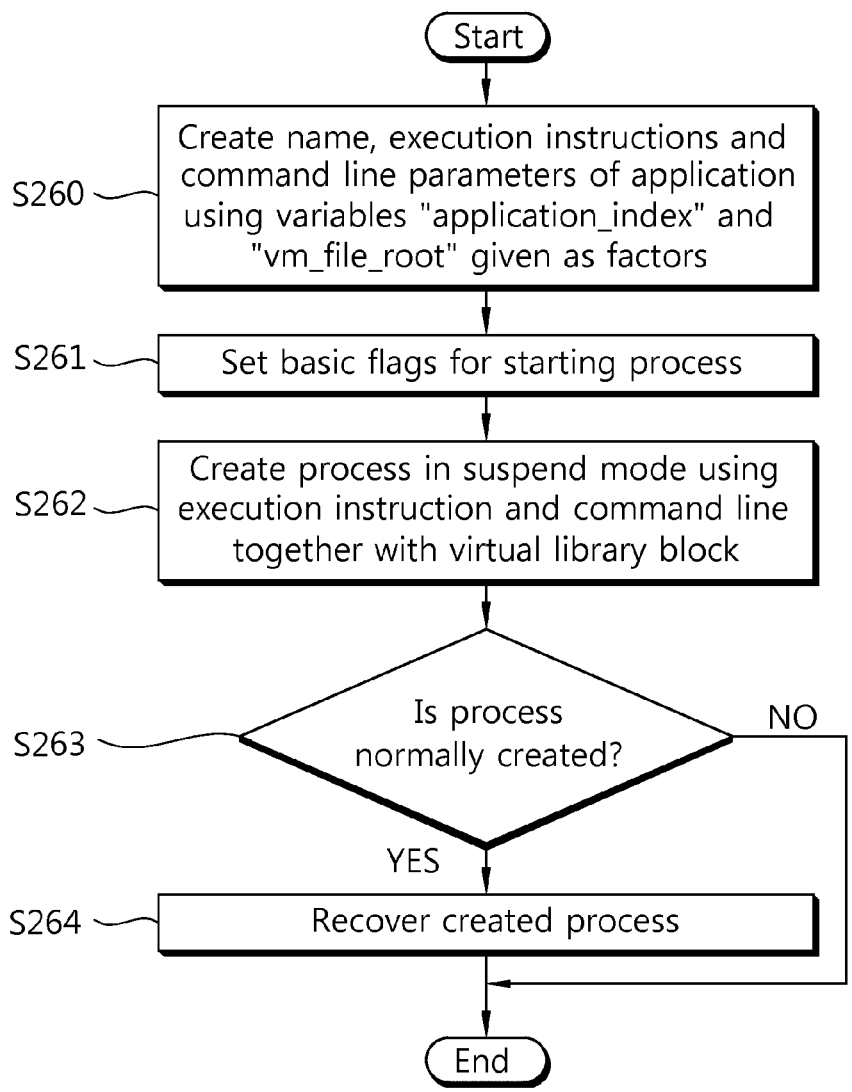
FIG. 27 is a flow chart showing the operation of a virtual application executing module of the virtual application execution block.

FIG. 27 is a flow chart showing the operation of the virtual application execution module 46 of the virtual application execution block 40.

Referring to FIG. 27, the virtual application execution module 46 creates the name, execution instructions and command line parameters of a virtual application using variables "application_index" and "vm_file_root" given as factors in step S260. Here, the variables "application_index" and "vm_file_root" can be provided by the virtual execution preparation module 41.

Subsequently, the virtual application execution module 46 sets basic flags for starting a virtual application execution process in step S261 and creates a virtual application execution process in the suspend mode using the created execution instructions and command lines together with the virtual environment library block 20 in step S262. Then, the virtual application execution module 46 confirms whether the virtual application execution process has been normally created in step S263, recovers the virtual application execution process in the suspend mode when the virtual application execution process has been normally created and performs the virtual application execution process in step S264.

The functions and operations of the components and modules of the virtual application creating system 100 according to a preferred embodiment of the present invention have been described. The virtual application creating system 100 can virtualize an application selected by a user, install the virtual application in an installation place selected by the user and execute the installed virtual application. Accordingly, it is possible to connect an external storage unit to a specific host computer, install a virtual application in the external storage unit, connect the external storage unit to another host computer and execute the virtual application.

Figure 28:
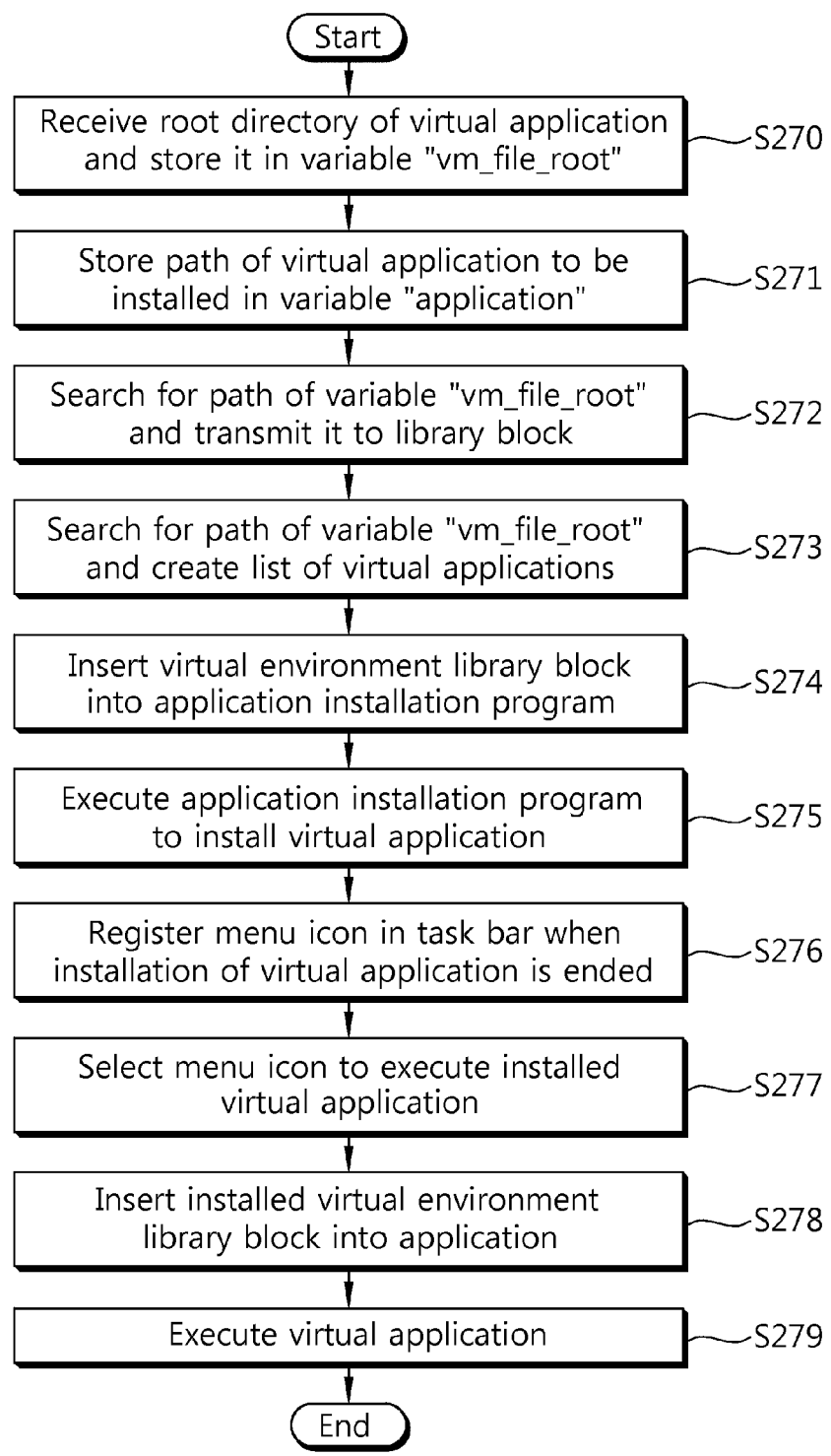
FIG. 28 is a flow chart showing the overall operation of the virtual application creating system illustrated in FIG. 1.

FIG. 28 is a flow chart showing the overall operation of the virtual application creating system 100 illustrated in FIG. 1.

Referring to FIGS. 1 through 28, the virtual application installation block 10 is executed first in order to install a virtual application. The virtual application installation block 10 receives information on an installation place where the virtual application will be installed, that is, the root directory of the virtual application, from a user and stores the root directory in the variable "vm_file_root" in step S270. Here, the installation place can be an external storage unit, for example, a storage region included in an external hard disk or a flash memory connected to a host computer.

Furthermore, the virtual application installation block 10 allows the user to select setup file position information of an application to be virtualized, receives the position information as a factor and stores the position information in the variable "application" in step S271.

Then, the virtual application installation block 10 transmits the stored variable "vm_file_root" to the virtual environment library block 20 in step S272. In addition, the virtual application installation block 10 can detect the path of the variable "vm_file_root" to create a list of virtual applications previously installed in the corresponding place in step S273.

Subsequently, the virtual application installation block 10 acquires an installation process of the application selected by the user using the stored variable "application", performs a predetermined process, inserts the virtual environment library block 20 into the application installation process in step S274 to convert the application installation process to a virtual application installation process, and then executes the virtual application installation process to install the virtual application in step S275. Here, the installed virtual application is processed by the modules of the virtual environment library block 20 as a virtual environment and installed in the place selected by the user, for example, an external storage unit.

When the installation of the virtual application is finished, the user can connect the external storage unit to another host computer and execute the virtual application execution block 40 to use the virtual application.

The virtual application execution block 40 registers a menu icon capable of executing the installed virtual application in a task bar in step S276. Then, the user can select the menu icon to execute the virtual application in step S277. When the user selects the menu icon, the virtual application execution block 40 inserts the installed virtual environment library block 20 into the virtual application in step S278 and executes the virtual application in step S279. Accordingly, the user can install the virtual application in the external storage unit and use the virtual application independently from the host computer.

According to the above-described preferred embodiments of the present invention, only modules capable of performing virtualization are copied to a virtual execution environment in order to install a virtual application. Accordingly, a complicated installation procedure such as pre-scan or post-scan is not needed when the virtual application is installed and the virtual application can be installed through a single application installation process. Furthermore, an application installed in a host execution environment is not affected even though an application identical to the application installed in the host execution environment is installed in a virtual environment through virtualization and host processing procedures provided by the modules of the virtual environment library block 20.

While this invention has been particularly shown an described with reference to preferred embodiments thereof, it will be understood by those skilled in the art that various changes in form and details may be made therein without departing from the spirit and scope of the invention as defined by the appended claims.

In particular, while variables having various terms ("wm_file_root", "application", etc.) have been described in the aforementioned embodiments of the present invention, the variables can be changed in various forms. Therefore, the scope of the invention is defined not by the detailed description of the invention but by the appended claims, and all differences within the scope will be construed as being included in the present invention.

The invention claimed is:

1. A virtual application creating system comprising:
a virtual environment library block including a plurality of modules that process native application program interfaces (APIs) of an operating system of a host computer such that the native APIs are suited to a virtual environment independent of a host executed environment of the host computer, the virtual environment library block configured to find a module capable of processing a specific native API from the plurality of modules when the specific native API is called and operating the found module to process a function of the called native API in the virtual environment;
a virtual application installation block comprising a virtual installation preparation module receiving position information identifying a position of setup information for setting up an application to be virtualized and information on an installation place where the application to be virtualized will be installed from a user, storing the information as variables and providing the stored variables to a specific module, and a virtual environment library insertion module creating an application installation process, in a suspended mode, using the position information, provided by the virtual installation preparation module, and inserting the virtual environment library block into a memory to install a virtual application in the installation place, wherein the virtual environment library insertion module fetches the application installation process using the position information as a location of a setup file of the application received as a factor, inserts the virtual environment library block into the application installation process to convert the application installation process to a virtual application installation process to install the virtual application, and then starts the virtual application installation process; and a virtual application execution block executing the virtual application installed in the installation place.

2. The virtual application creating system of claim 1, wherein the virtual installation preparation module receives the root directory of the virtual application as a factor, stores the factor in a variable "vm_file_root", stores the position information as a location of a setup file of the application in a variable "application" and transmits the stored variable "vm_file_root" to the virtual environment library block.

3. The virtual application creating system of claim 1, wherein the virtual installation preparation module searches for the installation place according to the received information on the installation place to create a list of virtual applications.

4. The virtual application creating system of claim 1, wherein the native APIs of the operating system are window native APIs which are classified into a plurality of classes.

5. The virtual application creating system of claim 4, wherein the plurality of classes comprises:
   a first class that receives a variable "POBJECT_ATTRIBUTES ObjectAttributes" as a factor and includes window native APIs that return data with respect to a PHANDLE type file or key;
   a second class that receives data with respect to a HANDLE type file or key as a factor and includes window native APIs that return character strings related to object names; and
   a third class that includes window native APIs that require child objects of objects.

6. The virtual application creating system of claim 5, wherein the virtual environment library block comprises:
   a first class virtual file processing module processing a file related API among the native window APIs belonging to the first class such that the file related API is suited to a virtual environment;
   a first class virtual registry processing module processing a registry related API among the native window APIs belonging to the first class such that the registry related API is suited to the virtual environment;
   a second class virtual file processing module processing a file related API among the native window APIs belonging to the second class such that the file related API is suited to the virtual environment;
   a second class virtual registry processing module processing a registry related API among the native window APIs belonging to the second class such that the registry related API is suited to the virtual environment;
   a third class virtual file processing module processing a file related API among the native window APIs belonging to the third class such that the file related API is suited to the virtual environment; and
   a third class virtual registry processing module processing a registry related API among the native window APIs belonging to the third class such that the registry related API is suited to the virtual environment.

7. The virtual application creating system of claim 5, wherein the plurality of classes further comprises:
   a fourth class including window native APIs used for an application installation process; and
   a fifth class including window native APIs used to store, recover and delete registry while an application is executed.

8. The virtual application creating system of claim 7, wherein the virtual environment library block further comprises:
   a fourth class virtual environment library insertion module processing the native window APIs belonging to the fourth class such that the native window APIs are suited to a virtual environment; and
   a fifth class virtual registry storage module, a fifth class virtual registry recovery module and a fifth class registry deletion module which process the native window APIs belonging to the fifth class such that the native window APIs are suited to the virtual environment.

9. The virtual application creating system of claim 1, wherein the virtual application execution block comprises:
   a virtual execution preparation module storing information of the root directory of a virtual application to be executed and the position information as variables and providing the stored variables to a specific module; and
   a virtual application execution module creating a virtual application execution process using the information provided by the virtual execution preparation module and executing the virtual application.

10. The virtual application creating system of claim 9, wherein the virtual application execution module creates the name, execution instructions and command line parameters of the virtual application using the information provided by the virtual execution preparation module, sets flags for starting the virtual application execution process and creates the virtual application execution process using the created execution instructions and command lines together with the virtual environment library block.

11. The virtual application creating system of claim 9, wherein the virtual application execution block comprises:
   a window creating module initializing a window class, registering the initialized window class, creating a window and acquiring a window handle of the created window;
   a task-bar icon creating module creating an icon of the virtual application execution block in a task bar;
   a call-back message processing module processing a call-back message according to the operation of the icon created by the task-bar icon creating module; and
   a task-bar pop-up menu creating module creating a pop-up menu according to call of the call-back message processing module and registering a virtual application list from which the installed virtual application can be selected in the created pop-up menu as a menu.

12. The virtual application creating system of claim 1, wherein the installation place is a specific directory of an external storage unit.

13. A method for installing a virtual application on a device coupled to a host computer, comprising the steps of:
   receiving position information identifying a position of setup information for setting up an application to be virtualized and information on an installation place on the device where the application to be virtualized will be installed from a user;

storing the information as variables and providing the stored variables to a specific module;

creating an application installation process, in a suspended mode, using the received position information; inserting a virtual environment library block including a plurality of modules into a memory to install a virtual application in the installation place, the modules processing native application program interfaces (APIs) of an operating system of the host computer such that the native APIs are suited to a virtual environment independent of a host executed environment of the host computer, the virtual environment library block configured to find a module capable of processing a specific native API from the plurality of modules when the specific native API is called and operating the found module to process a function of the called native API in the virtual environment;

fetching the application installation process using the position information as a location of a setup file of the application received as a factor;

inserting the virtual environment library block into the created application installation process to convert the application installation process to a virtual application installation process to install the virtual application; and performing the virtual application installation process to install a virtual application in the installation place.

14. The method of claim 13, further comprising the steps of:

confirming a module capable of processing a specific native API among the plurality of modules when the specific native API is called while a virtual application is installed and executed; and operating the confirmed module to process a function of the called native API in the virtual environment.

15. The method of claim 13, further comprising the steps of:

creating a virtual application execution process for executing the virtual application using the information included in the variables; and inserting a virtual environment library including a plurality of modules capable of constructing the virtual environment into the created virtual application execution process and performing the virtual application execution process.

* * * * *